US009805005B1

(12) United States Patent
Baschy

(10) Patent No.: US 9,805,005 B1
(45) Date of Patent: *Oct. 31, 2017

(54) ACCESS-CONTROL-DISCONTINUOUS HYPERLINK HANDLING SYSTEM AND METHODS

(71) Applicant: Niresip LLC, Jacksonville, FL (US)

(72) Inventor: Leo M Baschy, Copperopolis, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/854,520

(22) Filed: Sep. 15, 2015

Related U.S. Application Data

(63) Continuation of application No. 11/308,636, filed on Apr. 15, 2006, now Pat. No. 9,176,934.

(Continued)

(51) Int. Cl.
| | |
|---|---|
| G06F 3/00 | (2006.01) |
| G06F 3/048 | (2013.01) |
| G06F 17/00 | (2006.01) |
| G06F 17/22 | (2006.01) |
| G06F 17/21 | (2006.01) |
| G06F 3/0484 | (2013.01) |
| G06F 21/62 | (2013.01) |
| G06F 15/177 | (2006.01) |
| G06F 3/033 | (2013.01) |

(52) U.S. Cl.
CPC ........ G06F 17/2235 (2013.01); G06F 3/0484 (2013.01); G06F 17/211 (2013.01); G06F 21/6218 (2013.01)

(58) Field of Classification Search
None
See application file for complete search history.

(56) References Cited

U.S. PATENT DOCUMENTS

| | | |
|---|---|---|
| 5,379,423 A | 1/1995 | Mutoh et al. |
| 5,550,968 A | 8/1996 | Miller et al. |

(Continued)

FOREIGN PATENT DOCUMENTS

| | | |
|---|---|---|
| JP | 2011-186818 A | 9/2011 |
| WO | WO2004010258 | 1/2004 |

OTHER PUBLICATIONS

Agapow et al, Wikipedia article on Role Based Access Control, Jun. 16, 2011, http://en.wikipedia.org/wiki/Rbac.

(Continued)

*Primary Examiner* — Yongjia Pan

(57) ABSTRACT

The term "access-control-discontinuous hyperlink" is used to describe a hyperlink which at least one user (an authorized user who could be reading its containing document) isn't authorized to follow. Access-control-discontinuous hyperlinks are automatically detected at various times, including at the end of document editing. If any are found, the operator is notified and given options to reduce the number of access-control-discontinuous hyperlinks and to reduce the number of affected users. Several alternative views of relevant information are provided, integrated with common document editing user interface elements. Sorted views enable the operator to identify and to remedy problems more efficiently and with greater confidence. Access dependency settings for selected text can be inserted with a single command. The operator can preview what various sets of users would see. Users are graphically represented by displays comprising photographic likenesses.

13 Claims, 23 Drawing Sheets

Related U.S. Application Data

(60) Provisional application No. 60/595,322, filed on Jun. 22, 2005, provisional application No. 60/594,794, filed on May 6, 2005.

(56) References Cited

U.S. PATENT DOCUMENTS

| | | | |
|---|---|---|---|
| 5,675,782 A | 10/1997 | Montague et al. | |
| 5,708,780 A | 1/1998 | Levergood et al. | |
| 5,742,759 A | 4/1998 | Nessett et al. | |
| 5,760,917 A | 6/1998 | Sheridan | |
| 5,761,669 A | 6/1998 | Montague et al. | |
| 5,929,854 A | 7/1999 | Ross | |
| 6,101,480 A | 8/2000 | Conmy et al. | |
| 6,154,741 A | 11/2000 | Feldman | |
| 6,185,684 B1 | 2/2001 | Pravetz et al. | |
| 6,202,066 B1 | 3/2001 | Barkley et al. | |
| 6,205,476 B1 | 3/2001 | Hayes, Jr. | |
| 6,233,618 B1 | 5/2001 | Shannon | |
| 6,393,468 B1 | 5/2002 | McGee | |
| 6,493,731 B1 | 12/2002 | Jones et al. | |
| 6,502,102 B1 | 12/2002 | Haswell et al. | |
| 6,523,027 B1 | 2/2003 | Underwood | |
| 6,711,687 B1 | 3/2004 | Sekiguchi | |
| 6,738,973 B1 | 5/2004 | Rekimoto | |
| 6,768,999 B2 | 7/2004 | Prager et al. | |
| 6,950,943 B1 | 9/2005 | Bacha et al. | |
| 6,990,631 B2 | 1/2006 | Narahara | |
| 7,051,282 B2* | 5/2006 | Marcjan | G06F 3/0486 715/741 |
| 7,076,558 B1 | 7/2006 | Dunn | |
| 7,079,177 B2 | 7/2006 | Okazaki et al. | |
| 7,089,530 B1 | 8/2006 | Dardinski et al. | |
| 7,272,639 B1* | 9/2007 | Levergood | H04L 63/10 709/203 |
| 7,272,815 B1* | 9/2007 | Eldridge | G06F 8/71 707/999.009 |
| 7,287,227 B2 | 10/2007 | Ries et al. | |
| 7,305,624 B1 | 12/2007 | Siegel | |
| 7,321,931 B2 | 1/2008 | Banerjee et al. | |
| 7,437,468 B2 | 10/2008 | Yamamoto et al. | |
| 8,223,134 B1 | 7/2012 | Forstall et al. | |
| 8,875,261 B2 | 10/2014 | Delia et al. | |
| 9,129,088 B1 | 9/2015 | Baschy | |
| 9,202,068 B2 | 12/2015 | Baschy | |
| 2001/0037379 A1 | 11/2001 | Livnat | |
| 2001/0052003 A1 | 12/2001 | Seki et al. | |
| 2002/0070865 A1 | 6/2002 | Lancos et al. | |
| 2002/0099837 A1 | 7/2002 | Oe et al. | |
| 2002/0141639 A1 | 10/2002 | Steinberg | |
| 2002/0162002 A1 | 10/2002 | Gunter et al. | |
| 2002/0167538 A1 | 11/2002 | Bhetanabhotla | |
| 2002/0184160 A1 | 12/2002 | Tadayon et al. | |
| 2003/0023632 A1* | 1/2003 | Ries | G06F 17/3089 715/235 |
| 2003/0061087 A1 | 3/2003 | Srimuang | |
| 2003/0163811 A1 | 8/2003 | Luehrs | |
| 2003/0164856 A1 | 9/2003 | Prager et al. | |
| 2003/0236996 A1 | 12/2003 | Himmel et al. | |
| 2004/0019799 A1 | 1/2004 | Vering et al. | |
| 2004/0054790 A1 | 3/2004 | Himmel et al. | |
| 2004/0103202 A1 | 5/2004 | Hildebrand et al. | |
| 2004/0117194 A9 | 6/2004 | Lee et al. | |
| 2004/0135805 A1 | 7/2004 | Gottsacker et al. | |
| 2004/0193606 A1 | 9/2004 | Arai et al. | |
| 2004/0267746 A1 | 12/2004 | Marcjan et al. | |
| 2004/0267871 A1 | 12/2004 | Pratley et al. | |
| 2005/0028080 A1* | 2/2005 | Challenger | G06F 17/248 715/205 |
| 2005/0097440 A1 | 5/2005 | Lusk et al. | |
| 2005/0138566 A1 | 6/2005 | Muller et al. | |
| 2005/0198139 A1 | 9/2005 | Malkin et al. | |
| 2005/0211784 A1 | 9/2005 | Justin | |
| 2006/0041460 A1 | 2/2006 | Aaron | |
| 2006/0059462 A1 | 3/2006 | Yamamoto | |
| 2006/0080432 A1 | 4/2006 | Spataro et al. | |
| 2006/0101341 A1* | 5/2006 | Kelly | G06F 17/30899 715/738 |
| 2006/0106802 A1 | 5/2006 | Giblin et al. | |
| 2006/0117382 A1 | 6/2006 | Karabulut | |
| 2006/0155705 A1 | 7/2006 | Kamper et al. | |
| 2006/0168529 A1 | 7/2006 | Rokosz et al. | |
| 2006/0195520 A1 | 8/2006 | Stevens et al. | |
| 2006/0292537 A1 | 12/2006 | Nute et al. | |
| 2007/0050362 A1 | 3/2007 | Low et al. | |
| 2007/0055775 A1 | 3/2007 | Chia | |
| 2007/0058730 A1 | 3/2007 | Bowra et al. | |
| 2007/0198637 A1 | 8/2007 | Deboy et al. | |
| 2007/0203980 A1 | 8/2007 | Andersen | |
| 2012/0179764 A1 | 7/2012 | Erdal | |
| 2012/0254303 A1 | 10/2012 | Anbalagan et al. | |
| 2013/0246470 A1 | 9/2013 | Price et al. | |

OTHER PUBLICATIONS

David Nagel interview, Changing Lives Through Technology, ACM Ubiquity, vol. 5, Issue 6, Apr. 7-13, 2004.

Eswaran Subrahmanian, n-dim group Project LIRE, Jul. 2002, http://www.ndim.edrc.cmu.edu/papers/lire.htm.

Google search for the exact wording or phrase "access-control-discontinuous hyperlink", Jun. 30, 2010.

Google search for the exact wording or phrase "discontinuous hyperlink", Jun. 29, 2010.

Johannes Helmig, Windows XP Access control via Security, Dec. 9, 2001, http://www.windowsnetworking.com/articles_tutorials/wxp-pfsec.html.

Ka-Ping Yee, User Interaction Design for Secure Systems, Dec. 2002, http://people.ischool.berkeley.edu/~ping/sid/.

Leo Baschy, Researched History of SubEthaEdit Software, May 13, 2008.

Microsoft, Use access control to restrict who can use your files, Windows XP Professional, Aug. 24, 2001, http://www.microsoft.com/windowsxp/using/security/learnmore/accesscontrol.mspx.

Roy A. Ruddle et al, The effects of hyperlinks on navigation in virtual environments, International Journal of Human-Computer Studies, vol. 53, Issue 4, Oct. 2000, pp. 551-581, ISSN: 1071-5819.

Tara Whalen et al, User Experiences with Sharing and Access Control, CHI 2006 Conference Extended Abstract, Apr. 2006, ACM 1-59593-298-4/06/0004.

Unknown, Obiki documentation of The Access Control Tab, Dec. 2004, http://www.obiki.org/docs/accesscontrol.html.

David Vronay, Why Google+is still not working for humans, Apr. 18, 2012, http://dvronay.blogspot.com/2012/04/why-google-is-still-not-working-for.html.

Tim Berners-Lee, Information Management: A Proposal, CERN, Mar. 1989, http://www.w3.org/History/1989/proposal-msw.html.

Unknown, Wikipedia article on Visual Display Unit, Jun. 24, 2012, http://en.wikipedia.org/wiki/Visual_display_unit.

Unknown, Wikipedia article on False Premise, Mar. 16, 2012, http://en.wikipedia.org/wiki/False_premise.

Small Wonders Software, Security Explorer Data Sheet, Mar. 31, 2004.

Quest Software, Inc., Quest Security Explorer Data Sheet, Jul. 27, 1012, http://www.quest.com/Quest_Site_Assets/PDF/Quest-Security-Explorer-Datasheet.pdf.

Quest Software, Inc., Quest Security Explorer Tour, Jul. 27, 1012, http://www.quest.com/security%2Dexplorer/walkthrough/default.html.

Internet Business Corporation PTY LTD, Verdi CMS—Granular Permissions, Jul. 27, 2012, http://www.verdicms.com/3/36/4/granular_permissions.pm.

Chris Newman, RE: need review for draft-ietf-ldaoext-acl-reqts-01.txt, Apr. 14, 1999, http://lists.w3.org/Archives/Public/ietf-discuss/1999Apr/0005.html.

S. Shepler et al, IETF RFC 3010—NFS version 4 Protocol, Dec. 2000.

S. Shepler et al, IETF RFC 3530—Network File System NFS version 4 Protocol, Apr. 2003.

(56) References Cited

OTHER PUBLICATIONS

G. Clemm et al, IETF RFC 3744—Web Distributed Authoring and Versioning WebDAV Access Control Protocol, May 2004.
E. Stokes et al, IETF RFC 2820—Access Control Requirements for LDAP, May 2000.
J. Myers, IETF RFC 2086—IMAP4 ACL extension, Jan. 1997.
Craig R. McClanahan, Authentication and Access Control for Web Applications, JavaOne Session #1291, Jun. 2001.
Nataraj Nagaratnam et al, The Security Architecture for Open Grid Services, Jul. 17, 2002.
David Becker, Software makers ready desktop lockdown, Apr. 20, 2004, http://news.cnet.com/2100-1001_3-5194756.html.
Bruce Chizen interview, Getting Reorganization Right: How Bruce Chizen Drove Change and Innovation at Adobe Systems, Knowledge@Wharton, Apr. 21, 2004.
Cutcom Software Inc., SentryFile Brochure, Jul. 28, 2012, http://www.sentryfile.com/download/sf5_brouchureAutoCapture.pdf.
Cutcom Software Inc., SentryFile Brochure, Jul. 18, 2006, http://www.sentryfile.com/index.cfm?index=Product/Screen_Shots.
Cutcom Software Inc., SentryFile screen shots, Jan. 24, 2004, http://web.archive.org/web/20040306064540/http://www.sentryfile.com/index.cfm?index=Product/Screen_Shots.
Unknown, Wikipedia article on Health Insurance Portability and Accountability Act, Aug. 3, 2012, http://en.wikipedia.org/wiki/Health_Insurance_Portability_and_Accountability_Act.
Unknown, Wikipedia article on Electronic health record, Aug. 3, 2012, http://en.wikipedia.org/wiki/Electronic_health_record.
Unknown, Wikipedia article on Personal health record, Aug. 3, 2012, http://en.wikipedia.org/wiki/Personal_health_record.
Healthcare Information and Management Systems Society—HIMSS, Defining and Testing EMR Usability, Jun. 2009, http://www.himss.org/content/files/HIMSS_DefiningandTestingEMRUsability.pdf.
David Nagel email, Re: results of 7 years User Interface for Access Control, Sep. 6, 2005.
Bryan Kaufman email, Re: HIPAA, EHR, and User Interface Driven Access Control, Aug. 3, 2012.
Unknown, Wikipedia article on Group in computing, Sep. 30, 2012, http://en.wikipedia.org/wiki/Group_%28computing%29.
Unknown, Wikipedia article on Audience, Sep. 30, 2012, http://en.wikipedia.org/wiki/Audience.
Unknown, Wikipedia article on Filename, Apr. 30, 2013, http://en.wikipedia.org/wiki/Filename.
Unknown, Wikipedia article on Variable in computer science, May 1, 2013, http://en.wikipedia.org/wiki/Variable_%28computer_science%29.
Unknown, Wikipedia article on Tooltip, May 2, 2013, http://en.wikipedia.org/wiki/Tooltip.
Google search for the words "broken hyperlink", May 24, 2013.
Unknown, Webopedia Computer Dictionary entry for "broken hyperlink", May 24, 2013, http://www.webopedia.com/TERM/B/broken_hyperlink.html.
Unknown, Object Management Group article "Verfying Hyperlinks", May 21, 2012, http://www.omg.org/tutorial/list_broken_hyperlinks.htm.
Microsoft Corporation, So that's how!Great FrontPage features sections 16 and 17, May 24, 2013, http://office.microsoft.com/en-us/training/fix-broken-hyperlinks-RZ006197816.aspx ? section=16
A. Aimar et al., WebLinker, a tool for managing WWW cross-references, Computer Networks and ISDN Systems 28 1955 99-107, Jan. 1995.
D. Ingham et al., Fixing the Broken-Link problem: The W3Objects approach, Computer Networks and ISDN Systems 28 1996 1255-1268, Jan. 1996.
brokenlinkcheck.com Website, Fehlermeldungen, Mar. 26, 2004, https://web.archive.org/web/20040326053617/http://brokenlinkcheck.com/.
Sri Atluru et al., English Language & Usage Stack Exchange, Jun. 9, 2011, http://english.stackexchange.com/questions/29141/.
Fumblefingers et al., English Language & Usage Stack Exchange, Feb. 26, 2012, http://english.stackexchange.com/questions/59292/.
Barrie England et al., English Language & Usage Stack Exchange, Jan. 23, 2012, http://english.stackexchange.com/questions/55686/.

\* cited by examiner

ACCESS-CONTROL-DISCONTINUOUS HYPERLINK HANDLING SYSTEM AND METHODS

RELATED APPLICATIONS

This application is a continuation of U.S. patent application Ser. No. 11/308,636, filed 2006 Apr. 15 by Baschy, entitled "User Interface For Nonuniform Access Control System and Methods", the content of which is hereby incorporated by reference as if set forth fully herein.

This application claims priority from U.S. Provisional Application Ser. No. 60/594,794 filed May 6, 2005 by Baschy, entitled "User Interface For Nonuniform Access Control System And Method", the contents of which is hereby incorporated by reference.

This application also claims priority from U.S. Provisional Application Ser. No. 60/595,322 filed Jun. 22, 2005 by Baschy, entitled "User Interface For Nonuniform Access Control System And Methods", the contents of which is hereby incorporated by reference.

The present invention has been developed and hence can be understood more easily when knowing the invention described in U.S. patent application Ser. No. 10/802,658 filed Mar. 17, 2004 on behalf of Baschy, entitled "User Interface Driven Access Control System and Method", published Dec. 2, 2004 as U.S. Patent Application Pub. No. 2004/0239700, from which U.S. Pat. No. 9,003,295 has been issued Apr. 7, 2015, the disclosure of which is hereby incorporated by reference in its entirety. This reference is meant to point towards preferred components and to share concepts.

FIELD OF THE INVENTION

The present invention is a method for further improving the ease of use of access control systems employed in computer information storage, retrieval, transmission, and creation.

BACKGROUND OF THE INVENTION

There is a rich body of art regarding document editing, with a recent emphasis on markup languages. There are a number of access control systems, which often have been difficult enough to hinder their use. Each of those areas has been traditionally treated without regard for the other. Many who practice the art and those who use the systems they have produced (to work with documents) have become accustomed to working with access control settings being less than ideal. Aforementioned patent application Ser. No. 10/802,658 provides some relief.

BRIEF DESCRIPTION OF THE INVENTION

Systems as described in aforementioned patent application Ser. No. 10/802,658 can lead to better use of access control systems, specifically to a great increase in varying access control settings for different documents. Consequentially there would be a great number of hyperlinks that lead to documents with different access control settings, which often would mean people (users) could not follow hyperlinks, i.e. they are denied access to a linked document. Then, the apparent quick fix of authoring separate documents for different people (target audiences) all too easily in a few steps would lead to effective loss of control. Resulting problems can be anything from expensively time consuming to unacceptable risk and damage in sensitive environments. The present invention provides a complementary method for making users of information processing systems more productive, in a more secure manner. The present invention provides a graphical user interface which integrates access control concepts directly with document editing, rather than requiring a separate system for "permissions" or "user rights" as is common in the prior art.

DETAILED DESCRIPTION OF THE INVENTION

Figure 1:
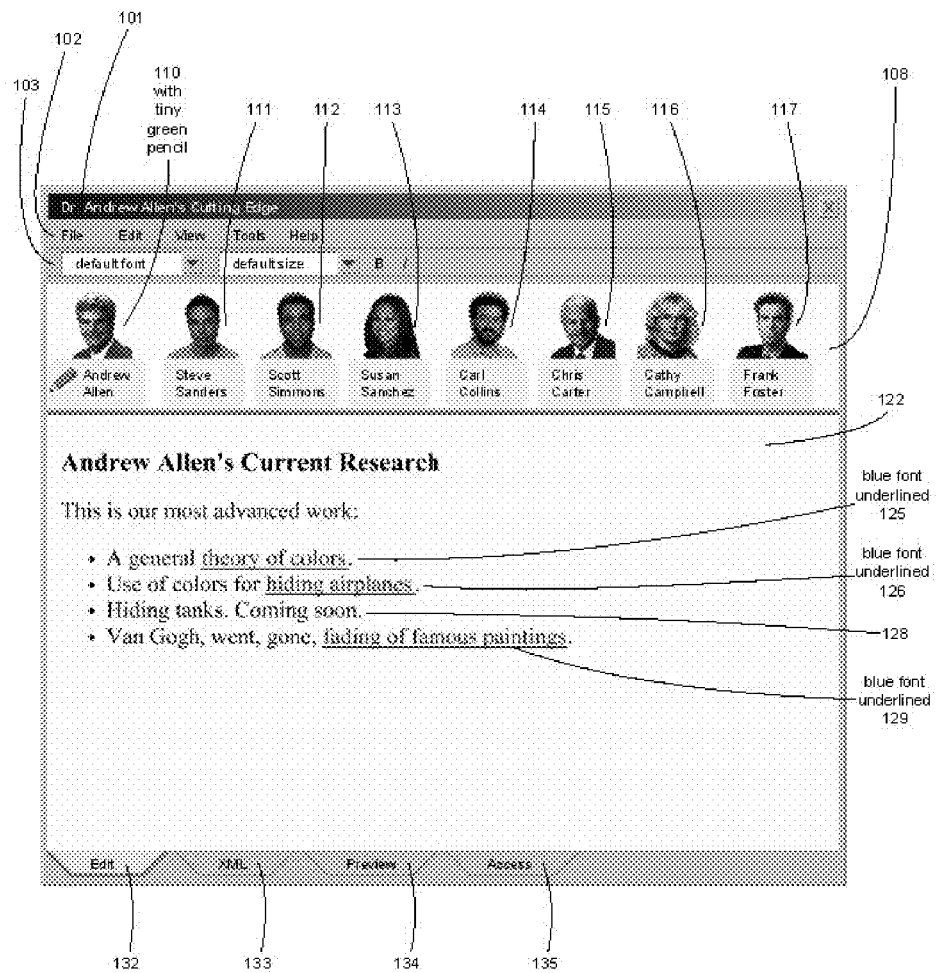
FIG. 1: The operator has authored a document which contains hyperlinks to other documents and which will be available for access by other users.

People (professionals and others) have become used to applying the same access control settings to large sets of otherwise distinct data. People have become used to allowing more access than is necessary. Neither is a good development.

At the same time, people have become used to messages stating that they are denied access to a document. That could be just annoying, it could be stressful, it could cause dissatisfaction in an organization, or it could be a trigger that starts a security incident.

As a result of development, deployment and use of new software there will be a great increase in the number of different access control settings in effect per body of resources.

The present invention concerns itself with essential factors of operator productivity when working under these new circumstances, i.e. when a greater variety of access control settings are in effect.

The present invention has been devised to work well but not only with systems built as described in aforementioned patent application Ser. No. 10/802,658.

At the time of this disclosure, the best mode contemplated by the inventor for carrying out the present invention is an implementation as document editing client software with storage server software connected via Web services (information about Web services is at the World Wide Web Consortium website). It is expected, however, that once the usefulness of the present invention has become apparent to more people, the present invention will be considered for implementing with a number of system architectures. Because of the possibility of complexities of retrofitting into existing architectures, careful balance has been struck in this disclosure in order to provide a clear and concise yet still full and exact description of the present invention. In order to encourage widespread adaptation, neither a specific programming language nor a specific graphical user interface object library are required.

In order to implement the present invention, skills in both user interface engineering and access control engineering are required. In both fields there are practitioners of greatly varying levels of skill and experience. As an example, in user interface engineering there are those who solely have used user interface libraries and claim to have user interface engineering experience, and then there are those who have designed the libraries used by hundreds of thousands of others, e.g. Java Swing, or who have authored leading edge drawing software, e.g. Macromedia Freehand. As another example, in access control engineering there are many who have configured servers, while there are fewer who have designed actual executing code, e.g. mod ssl, or who have authored leading edge security software, e.g. PGP. The quality of an implementation will more or less depend on the skill and experience of those who engineer it. Other skills that might be considered distinct and helpful include experience in network protocols, markup language, Web services, storage servers, workflow, algorithm development, and rules engines.

According to the theory and practice of the present invention, "looks do matter". In order to achieve highest rates of correct decisions by operators in the shortest possible time with least effort, what the operator sees is of critical importance. Beyond a certain point, quantitative differences in visual appearance become qualitative differences. By analogy: If the font size of text is below a certain size, e.g. below four, then no one can read at all; if the font size is above a certain number, e.g. above thirty, then most people can read even if they didn't bring their glasses and would need glasses for regular sized text, e.g. for size ten. A quantitative difference in font size effects a difference in whether people can read at all, i.e. a qualitative difference.

According to the theory and practice of the present invention, there are practical limits to the amount of abstract reasoning that should be demanded of an operator of a system. These limits may be different from person to person; the limits may be different for a one-time effort and for repeated performance. According to the theory and practice of the present invention one can achieve much higher rates of correct decisions by operators by relieving them of the need to perform complex symbolic mental operations.

Terms and Explanations

For the purpose of clarity of this disclosure, the term "operator" has been used to identify the person who directly interacts with the "user interface", which hence would better be called "operator interface", were it not for the fact that "user interface" is an established term. Because the present invention concerns itself with access control, one "user" or several "users" may be depicted in the user interface, as well as "groups" of users. Users and groups are given access privileges for resources by the operator. The operator himself may also appear in the user interface, as one of a number of users.

An operator of the present invention often is expected to be a professional in a field that isn't computer science, possibly not technical at all.

Names and document contents used in examples herein are intended to be fictional.

Examples of "body of resources" include but are not limited to the tree of documents on a file server or on a hard disk, the set of medical records in a database, the set of messages a person has written and others.

While the theory and practice of the present invention can be applied to a variety of "resources", this disclosure for comprehension's sake emphasizes examples such as digital documents and medical records. Other kinds of resources, by their own novelty, could distract a contemporary audience from the essence of this disclosure. In many places where this disclosure reads "document" one could write "resource".

This disclosure may emphasize discussing "authorization for read access" because computationally, logically and in common sense it often can serve as basis for determining authorization for any and all other kinds of access.

In prior art literature a commonly used form of hyperlink uses an "a" element (e.g. <a href="wherever">click</a>), called an anchor element. Such an anchor element contains an "href" attribute (e.g. href="wherever"), called a locator attribute, the value of which (e.g. wherever) must be a URI reference. Other terms and inaccurate use of terms related to this form of hyperlink are common too, and might have slipped into this disclosure.

This disclosure describes tabs being used to switch between panels. If a tab is selected then a corresponding panel is displayed. The operator then can view and interact with that panel. Because of its convenient brevity, expressions like "the operator does this or that inside this or that tab" might have been used when instead a correct description would be "the operator does this or that inside the panel which corresponds with this or that tab". If used in such way, then "tab" should be interpreted as describing the actual tab together with its corresponding panel.

The term "likeness of a person" means an identifying pictorial representation of the person, an imitative image, e.g. an identifying photograph, possibly a modified photograph or a machine processed image of that person that sufficiently corresponds to the person's appearance to allow a normally skilled human to identify the person in an encounter with normal visual contact. Examples of "likeness of a person" are in FIGS. 1 to 23.

A "visual display unit" displays images generated from the output of devices such as computers. Contemporary examples of a "visual display unit" are thin film transistor liquid crystal screens, cathode ray tube monitors, electronic paper, organic light emitting diode display screens, and the like.

Prior Art 1

In many prior art systems, by design or prevalent use, a directory with documents would have one set of access control settings in effect for all of its contents. Either so because it is the only possibility, or adjusting settings differently would be expensive at least in terms of operator time and mental energy to expend. Examples of "a directory with documents" include but are not limited to a shared directory for the purpose of collaboration in a company department, a recursive directory with software source code, one person's place to make information available to any number of other people, or other directories.

There are many scenarios in business and other organizations where such indiscriminate information access control would not have been tolerated before the age of electronic information processing, and where it causes damage to business if tolerated. Yet, such indiscriminate information access control apparently often has been tolerated for a number of years now.

This disclosure foresees use of new software which effectively will allow operators to adjust access control settings per document without involvement of system administration skills, without involvement of system administration personnel and at a low cost in terms of operator time and mental energy to expend.

Prior Art 2

Similarly, in many prior art medical record systems, by design or prevalent use, all records are equally accessible to all members of any size group of medical personnel, with these members either being individually identified or in practice often with one login identity shared among real persons.

Such customs are becoming less acceptable, are in violation of emerging regulations and are becoming liabilities.

This disclosure foresees use of new software which effectively will allow medical personnel to accurately adjust access control settings per record without involvement of system administration skills, without involvement of system administration personnel and at a low cost in terms of medical personnel time and mental energy to expend.

Prior Art 3

Differently, in other prior art medical record systems by design most records are accessible to individuals only who have been assigned access by predefined workflow algorithms.

Such kind of limitation is problematic not only but specifically when a second opinion rapidly should be requested by a professional peer outside the predefined workflow algorithm. One apparent workaround in the mind of a professional aiming to deliver patient care would be to circumvent that limiting access control by taking information outside the limiting system. Realistically, an undesirable consequence could be a lower rate of requests for second opinion.

This disclosure foresees use of new software which effectively will allow medical personnel to accurately adjust access control settings per record without involvement of system administration skills, without involvement of system administration personnel, at a low cost in terms of medical personnel time and mental energy to expend and yet to be certain of compliance with legal, confidentiality and other requirements.

There will be at least two consequences of a great increase in the number of different access control settings in effect per body of resources:

Problem 1

One consequence will be more frequent occurrences of uncertainty in operators about which individual users effectively are allowed to access a specific document.

In theory and practice of the present invention "who effectively is allowed to access a specific document" generally means the set of individual users who have any access privilege at all for the resource, possibly marked up to differentiate kinds of access, including but not only read, write and others. The expected answer to asking "who effectively is allowed" is a set of "individual users", which is in contrast to access control settings (as stored permanently in a system) which commonly may contain references to groups.

This disclosure in some places use the terms "effective access control settings" versus "defined access control settings" in order to distinguish between who effectively is (which users effectively are) allowed to access a specific document versus access control settings as stored permanently in a system, which commonly may contain references to groups.

Some may want to be confirmed in their observation that this meaning is different than use of the expression "effective permissions" in Microsoft Windows XP Professional to describe a list that "displays the permissions that would be granted to the selected group or user, based on all relevant permissions". That appears to be a valid concept too, though of more narrow subject coverage than the larger concept discussed here.

Some relief from such uncertainty (about who effectively is allowed to access a specific document) can be provided by building systems as described in aforementioned patent application Ser. No. 10/802,658, specifically in section "GUI Each User". There, as an example, if access control settings define privileges held to be for user Lee to write, for group Marketing to read and for user Rolf to read, then a display of who effectively is allowed to access could show the corresponding set of individual users, determined by evaluating any groups into individual users, hence e.g. for user Lee to write, Hank to read, Thomas to read, Christoph to read and Rolf to read.

Other relief from such uncertainty, albeit in different scenarios within operator interaction with information system displays, can be provided by building systems using the techniques of the present invention.

Problem 2

Another consequence will be more frequent occurrences of hyperlinks from documents to other documents which the same user is not authorized to read, which may be termed "discontinuous hyperlinks".

Some relief from excessive creation of such discontinuous hyperlinks can be provided by building systems as described in aforementioned patent application Ser. No. 10/802,658, specifically in section "Access Dependent Contents".

A predominant purpose of the present invention is to provide even more practical relief from excessive creation of such discontinuous hyperlinks.

Example of Access Dependent Contents

In this disclosure the term "access dependency settings" is commonly used instead of "settings that determine dependency of contents upon access control". Access dependency settings are in effect for elements within documents, which is different than access control settings being in effect for whole resources.

Here is what a research scientist writes and "sees" himself in his WYSIWYG editor:

Andrew Allen's Current Research
This is our most advanced work:
   A general theory of colors.
   Use of colors for hiding airplanes.
   Hiding tanks Coming soon.
   Van Gogh, went, gone, fading of famous paintings.

Here is underlying markup language, as it could be created by many prior art systems:

```
<hl>Andrew Allen's Current Research</hl>
<p>This is our most advanced work:</p>
<ul>
   <li>A general
      <a href="publications/colortheory">theory of colors</a>.</li>
   <li>Use of colors for
      <a href="publications/camouflage">hiding airplanes</a>.</li>
   <li>Hiding tanks. Coming soon.</li>
   <li>Van Gogh, went, gone,
      <a href="publications/vangogh">fading of famous paintings</a>.</li>
</ul>
```

Next is underlying markup language according to the theory and practice of the invention of aforementioned patent application Ser. No. 10/802,658, specifically in section "Access Dependent Contents".

It is important to note access dependency settings in namespace "adc":

```
<hl>Andrew Allen's Current Research</hl>
<p>This is our most advanced work:</p>
<ul>
   <li>A general
      <a href="publications/colortheory">theory of colors</a>.</li>
   <li adc:onlyIf="publications/camouflage">Use of colors for
      <a href="publications/camouflage">hiding airplanes</a>.</li>
   <li adc:onlyIf="publications/camouflage">Hiding tanks. Coming soon.</li>
   <li>Van Gogh, went, gone,
      <a href="publications/vangogh">fading of famous paintings</a>.</li>
</ul>
```

Here is what his students see, automatically because they aren't authorized to see document camouflage:

Andrew Allen's Current Research
This is our most advanced work:
   A general theory of colors.
   Van Gogh, went, gone, fading of famous paintings.

Here is what his corporate sponsors see, automatically because they are authorized to see document camouflage:

Andrew Allen's Current Research
This is our most advanced work:
   A general theory of colors.
   Use of colors for hiding airplanes.
   Hiding tanks Coming soon.
   Van Gogh, went, gone, fading of famous paintings.

In this example access dependency settings have been encoded as markup language attribute adc:onlyIf= "publications/camouflage", which logically should be processed on the server when responding to a read request.

Here is alternative markup language, different access dependency settings, shorter but more expensive to process:

```
<hl>Andrew Allen's Current Research</hl>
<p>Here is a list of original papers:</p>
<ul>
   <li>A general
      <a href="publications/colortheory">theory of colors</a>.</li>
   <li adc:onlyIfRefs="true">Use of colors for
      <a href="publications/camouflage">hiding airplanes</a>.</li>
   <li adc:onlyIf="publications/camouflage">Hiding tanks. Coming soon.</li>
   <li>Van Gogh, went, gone,
      <a href="publications/vangogh">fading of famous paintings</a>.</li>
</ul>
```

Here is yet another alternative markup language, yet different access dependency settings, potentially even shorter but even more expensive to process:

```
<hl>Andrew Allen's Current Research</hl>
<p>Here is a list of original papers:</p>
<ul adc:itemsOnlyIfRefs="true">
   <li>A general
      <a href="publications/colortheory">theory of colors</a>.</li>
   <li>Use of colors for
      <a href="publications/camouflage">hiding airplanes</a>.</li>
```

```
    <li adc:itemLikePrev="true">Hiding tanks. Coming
        soon.</li>
    <li>Van Gogh, went, gone,
        <a href="publications/vangogh">fading of famous
        paintings</a>.</li>
</ul>
```

Above examples show "access dependency settings" encoded in a markup language, but these examples by themselves don't yet describe how the present invention aids operators to become efficient and to make correct decisions.
Working with Discontinuous Hyperlinks A first attempt at a definition tries to explain what one user would experience: In this disclosure the term "discontinuous hyperlink" is used to describe a hyperlink from one document (which an authorized user has been reading or could be reading) to another document which the same user, however, isn't (and/or wouldn't be) authorized to read (if he would try following the hyperlink).

A more correct definition introduces the important expression "at least one user": In this disclosure the term "discontinuous hyperlink" is used to describe a hyperlink which at least one user (an authorized user who could be reading its containing document) isn't authorized to follow.

Other terms that could be used (e.g. outside this disclosure) include "access-discontinuous hyperlink" or "access-control-discontinuous hyperlink".

Another term that could be used is "discontinuity", but that term has been seen to lend itself too easily to grammatically (and otherwise) correct use in sentences where it has different meanings, hence leading to the writing of texts that could cause a logically thinking person to spend extra time analyzing one word being used with more than one meaning.

In this disclosure the term "continuous hyperlink" is used to describe a hyperlink which all users (who could be reading its containing document) are authorized to follow.

There are different points of view in observing a discontinuous hyperlink. A user who isn't authorized to follow a hyperlink "experiences discontinuity" firsthand. One could say he "experiences the discontinuous nature of the hyperlink". One could also say "the hyperlink effects discontinuity for the user". Another user, however, one who is authorized to follow the same hyperlink, hence who is lacking the "experience of discontinuity", might not even be aware that someone else cannot follow the same hyperlink.

For a specific discontinuous hyperlink it is possible (even common) that some users would experience its discontinuous nature while others would not.

A hyperlink can be a discontinuous hyperlink without anyone knowing. By analogy: If a tenant lives in an apartment building where termites are eroding a beam then the tenant lives in a termite infected building, whether he knows it or not, whether there has been a pest inspection or not, whether the pest inspector has told the manager (yet) or not, whether the manager has told the owner or not, whether the owner has let the tenants know or not, last not least whether the pest inspector has found anything or not.

Some users might not be able to tell whether a hyperlink is discontinuous. That could be a mere side effect (e.g. of a specific implementation), or it could be a desirable feature.

The present invention concerns itself with enabling the author of a document (or a similarly controlling operator) to tell whether the hyperlinks he has created (or he is responsible for) are discontinuous.

In a system that has been designed to accommodate the present invention it should be possible for an algorithm to determine whether a hyperlink is discontinuous, at least for a hyperlink which references a document that is access controlled by the same system or that is access controlled by a system that provides a compatible interface to retrieve access control information.

It is possible, however, that a hyperlink references a document on a system from which it is not possible (at least not in an acceptable way) to retrieve such access control information as would be required to determine whether the hyperlink is discontinuous. It would then not be possible to determine whether that hyperlink is discontinuous. Such uncertainty then must be accepted and depending on requirements (per implementation, per installation, per user, etc) should be tolerated (plausible in many uses), or should lead to appropriately chosen notification (better security), or should lead to prohibition (for an extremely closed system). In this disclosure the term "uncertain hyperlink" is used to describe such hyperlink.

According to the theory and practice of the present invention, the author of a document (or a similarly controlling operator) should consider the points of view (the experiences) of all possible readers, i.e. the points of view of all users who will be able (authorized) to read the document.

A multidimensional space could be considered having at least some of the dimensions: Who is observing, which user is being observed, which document is being linked from, which document is being linked to, whether observing defined access control settings or observing effective access control settings, whether who is observing also is authorized to change access control settings, whether who is observing is intending to change access control settings, and others.

Understanding such dimensions can be helpful in designing and in making some decisions based on theory. As a practical matter, however, the full space of possibilities within those dimensions probably will not be considered and will not be coded out explicitly into all detail.

While considering different points of view, one focus of the present invention is to enable the author of a document (or a similarly controlling operator) first to recognize existing (and potential) discontinuous hyperlinks and then to effectively adjust settings to reduce occurrences of discontinuous hyperlinks to whatever acceptable levels. Hence, one could be tempted to say: While considering different points of view, the present invention focuses on authors' points of view. That, however, would not be a completely accurate description.

The present invention actually concerns itself with a system of two points of view: The author of a document is trying to comprehend (see) and control (manipulate) what other users can see. The present invention presents to the author representations (projections) of what other users can see. This would be inefficient by each time showing the author (full size or other) facsimiles (e.g. screenshots) of what each and every other user would see. Seen a little more abstractly, the present invention is about effectively making one operator (often the author) comprehend what many other users can and will see. The present invention is about effectively bringing into the author's field of view what all other users' points of view are or will be.

There are a number of users in a system. Of those, for a hyperlink from one document to another document, the "effective set of read authorized users for the referring document" (ESRAUG) can be in one of several different kinds of relationships to the "effective set of read authorized users for the referred document" (ESRAUD).

This disclosure concerns itself with more probable, aka normal, situations. E.g. it assumes the author is in ESRAUG and in ESRAUD. If not so, it would have taken some unusual circumstances or a contorted way to get there, then for that kind of situation "exception handling" is a known technique to catch it, and exception handling code could but would not have to include user interface to allow correction or to inform of the impossible nature of the attempt to edit that hyperlink by the author.

Following thoughts about discontinuous hyperlinks are true in their general theoretical nature too, but they are also what the author of a document may want to think about when authoring. The author, while authoring being an ("the") operator, obviously must be one of the users of the system. He will be thinking about other users mostly, as he himself already is in ESRAUG and in ESRAUD.

Users who are not in ESRAUG would not know about the existence of the hyperlink, hence they couldn't observe its discontinuous nature. It should be that simple: If one doesn't see the referring document then one doesn't see a hyperlink from it. (This statement consciously ignores someone looking up reverse links in logs, because the present invention concerns itself with more probable, aka normal, workflow. The inventor's present preferred embodiment works with access control that is in place already; it has to assume such access control is functional and sufficient. It is generally known that logs may contain reverse links from resources that are blocked. Whether client software should refrain from passing on that kind of information is outside the scope of this discussion.)

Users who are in ESRAUD and in ESRAUG will not experience the hyperlink's discontinuous nature. Simply: If one sees the referring document and the referred document then its seems a normal hyperlink that functions as expected.

Users who aren't in ESRAUD but who are in ESRAUG when following a hyperlink might experience e.g. an HTTP status code 401, unauthorized. Other options could be HTTP status code 403, forbidden, or 404, not found. In other words: If one sees the referring document and doesn't see the referred document then it appears the hyperlink leads into an error message. In access controlled system users may be familiar with such error messages. Whether users are familiar or not, authors may have a number of reasons why they don't want such situations to occur, including but not only undesirable disclosure of URIs and many different matters of workplace psychology or rules. A predominant purpose of the present invention is to enable authors of documents to reduce the number of instances in which users aren't in ESRAUD.

For a discontinuous hyperlink, the symptom for one user is that he cannot follow a hyperlink. From the document's author's (mathematical) point of view, considering all users, there is neither equality between the set of who effectively is allowed to access the referring document (ESRAUG) and the set of who effectively is allowed to access the referred document (ESRAUD) nor is the first a subset of the latter.

When trying to compare the two sets of who effectively is allowed to access two documents, in many instances, but not necessarily in all cases and circumstances, it should be computationally less expensive to compare the defining access control settings for the two documents. An implementation, however, also could be optimized to (correctly) make best use of previously determined (cached) effective sets of access authorized users.

An implementation of the present invention has some leeway in how much (in computation and in informing the operator) it wants to pay (or actually pays) attention to differences between defined access control settings rather than solely concerning itself with effective access control settings. Too many detailed messages can make an implementation more expensive, but if its code is meant to live for many years and to be used by people who have a variety of preferences or needs then it may be worth coding it out in detail and taking the time to fine tune wording that correctly describes various situations. In a time, however, when everyone wants everything quickly and cheaply one must expect that implementations throw together situations that are different in detail and then deal with them and describe them the same. Such approximations may work well for many uses. Fortunately, reviews of settings should be possible at any later point in time, in case someone really cares to know whether settings have mutated into an undesirable state as an unintended consequence of a simplification, or for any other reason. (In other words: In cases when equal effective access control settings are caused by different defined access control settings then to simply count the resulting equality could be acceptable in an implementation that is done with a tight development budget.)

One possible algorithm for comparing effective access control settings could be outlined: Determine the set of who effectively is allowed to access the referring document. For each element (user) determine whether authorized to access the referred document. If any one isn't authorized then it is a discontinuous hyperlink. Optionally, while making such determinations, a set of users who aren't authorized could be collected; and consequentially such set could be used e.g. as basis for an informative user interface display. If these steps are executed inside an outer loop for all or for several hyperlinks from a document then the set of who effectively is allowed to access the referring document only has to be determined once. The best method to "determine whether authorized to access the referred document" depends on the details of an implementation, with at least three strategies worth considering: (1) If an API has been implemented that if given a user identity, a document URI, and a requested access method then returns whether access is authorized then that API could be used; this strategy might be preferred if the referred document is controlled by a different system than the referring document. (2) If an API has been implemented that if given a document URI and a requested access method then returns the set of who effectively is allowed to access then that API could be used once per referred document to then repeatedly determine membership in that set; this strategy in some instances, but not necessarily in all, might give better performance than the previous strategy, although it might not be acceptable to use e.g. when such information should not be disclosed summarily from one system to another. (3) If inside the same access control server it is possible to programmatically access structured data of access control settings for a referred document then such structured data could be accessed; although with this strategy then special care would have to be taken (by development methodology and by quality assurance) not to introduce errors later in development when logic would be implemented in more than one place in code and later in development that logic would not be modified synchronously (and correctly) in all places in code.

Options for Resolution

There are at least four major options of what an author can do when trying to deal with a discontinuous hyperlink:

One option would be to further open up access control settings for the document linked to. The author may be able to do so if he is authorized to do so. It may happen, however, that the author is not in control of a document that someone else is in control of, for whatever (good) reason. Allowing more access just "for convenience" isn't such a good approach to security anyway.

Another option is to further restrict access control settings for the document linked from (presumably a document currently being edited by the author). The author in general should be able to make such change. The present invention intentionally supports this option. There are situations, however, where this would prevent otherwise highly desirable organization and flow of information.

Another option is to use access dependency settings to create access dependent contents. The present invention intentionally supports this option. This is an innovative feature, and it allows previously difficult to achieve organization and flow of information.

Another option would be to do nothing. That is default behavior in prior art, and some of its potential or real disadvantages have been mentioned elsewhere in this disclosure.

Describing GUI

This disclosure relies significantly on descriptions of graphical user elements, including descriptions of layouts of graphical user elements, of constraints of layouts, of changes in layouts in reaction to operator action, and of changes in layouts in reaction to other events, in terms familiar to those skilled in the art. The terms used have been chosen so that one skilled in the art, familiar with at least one user interface object platform, can with relative ease make graphical user elements of that platform behave as described.

Because of the different ways user interfaces have been and may be implemented, if the goal is to achieve a constraint then for the purpose of this disclosure it is best to describe the constraint rather than to describe instructions how to enforce the constraint (e.g. if two elements, one above the other, together are to keep a constant vertical dimension, then there are many different ways how code could be written that ensures that together they keep a constant height). By way of further illustration: If one element changes height it could send a message to the other, and vice versa. But, would it do so before or after changing its own height? Which element would perform the calculation to determine the height for the other element, the one initially changing, or the other element itself, or a supervising object? Would there be a short moment in which the total height actually would not equal the desired constant value? If so, then is that moment protected against concurrent access by another process thread? Could that momentary situation possibly flicker onto the screen? For the purpose of clarity of this disclosure it is better to simply state that the two elements are constrained together to a constant height. One skilled in the art can implement necessary constraint code to be compatible with, and making good use of what is available already in the user interface object platform that is being employed.

Another example for the duality of description and instruction are found in contemporary user interface design environments, e.g. Borland JBuilder 8 or NetBeans 3.4. With a few clicks of the mouse button, one can switch among three different ways of setting the size of a user interface element: (1a) One can drag the lower right corner of a representation of the user interface element, (1b) one can type width and height into a table of properties of the user interface element, or (2) one can directly edit an instruction in source code, most of which is being generated automatically, where a line reads something like "setSize (500,300)". One skilled in the art is accustomed to translating between (1) descriptions, e.g. as given in this disclosure, and (2) instructions necessary for a specific user interface object platform.

Interfacing Software Components

Theory and practical coding can show that there are a number of different ways how a GUI can interface with underlying access control settings and document data. The same is true for how client software and server software can interface.

Which implementation to choose should depend on demand (of compatibility with existing systems) and availability (of coding experience and skill).

One possible outline is given in aforementioned patent application Ser. No. 10/802,658, specifically in its section "Interfacing With Apache Web Server Software", also in its FIG. 2. Additional insight can be gained from its section "Underlying Model" and its FIGS. 3 to 8. If further interested, the GUI front end to those mechanisms is described in its section "Graphical User Interface".

As technology has evolved it now appears to have become somewhat more practical to implement interfaces as Web services. Also it appears to have become more practical to implement using Tomcat as Web server itself, no longer using both Apache and Tomcat.

Navigating Between Views

Details of almost any user interface can easily become the target of criticism, some valid, some odd, specifically in early stages of its existence as a product. To help the reader of this disclosure distinguishing essential advantages of the present invention from distracting questions, such as which modifier key to use to navigate from one screen to another, a short description of methodology is in order.

Designing an outstanding user interface to a large space of information is best done using certain techniques, which in this specific context might be described as follows:

The document in most systems is data. Whether so or not, multiple views of a document are a known concept in the art. Access control settings are based on data too, but they might not be retrieved and stored as a single block of data. Access control settings might be retrieved and stored by use of APIs, which might be programming language based APIs or Web services based. Out of an infinite number of possible views of the data of the document and access control settings the user interface should be able to present a finite number of views, which should be presented in ways that enable efficient work, that are conducive to comprehension, and that by their presentation can become familiar to operators in general or to a specifically targeted category of operators.

Those views in most user interfaces should be connected by ways to navigate between them. Transitions can be instantaneous or along pathways. A popular way of organizing views is in a tree, and tree objects have become common in widely used GUI libraries. In the art, a tree object might be visible in one section of a split pane, or a tree might be presented in the form of a tree of menus and submenus. One could make the point that tree views have become overly used, even if they don't ideally match the information or tasks at hand. With a good amount of caution, and hopefully with insight into people's ways of functioning at tasks, not least with systematic user observation, one can achieve great user interface by carefully going beyond forcing data and tasks to uniformly fit into a few objects in a GUI library, by making more differentiated use of available objects in a GUI library, and by coding additional GUI objects when needed.

One recurring point of criticism in early stages of innovative user interface software product are the choices of how to navigate between views. If the user interface puts every choice everywhere then there is overload. If something isn't immediately available somewhere then someone will com-plain. There is a technique called "progressive disclosure" which can be useful when it is appropriate. Allowing user preferences can be useful too. Preferences can be implemented to be set by the user himself, by a system administrator, or by the software itself. Preferences could adapt themselves in time to what the software observes the operator choose. Other than hard coding behavior, today's commonly available processing power should allow use of embedded expert systems to decide which choices to present. Special techniques used or not, the user interface still always should be clear and truthful.

That said, the reader of this disclosure should be assured that navigation between the views shown can be smoothed to match the effectiveness of the views themselves.

Example GUI

The examples of a GUI shown in FIGS. 1 to 23 are in an environment where certain conditions exist already: There is an author, Andrew Allen. There is a group "students", which consists of Steve Sanders, Scott Simmons, Susan Sanchez. There is a group "corporate", which consists of Carl Collins, Chris Carter, Cathy Campbell. There is a group "family", which consists of Frank Foster.

If interested, one could consider an alternative scenario: If group "family" would consist of both Frank Foster and Andrew Allen then these examples would look the same nonetheless.

Some access control settings have been set already, earlier, when writing those other documents: "publications/colortheory" is accessible for Andrew Allen, "students", and "corporate". "publications/camouflage" is accessible for Andrew Allen, and "corporate". "publications/vangogh" is accessible for Andrew Allen, "students", and "corporate".

In FIGS. 1 to 23 the author is the operator. The reader of this disclosure sees what the author of the document (being the operator) sees on his computer display.

Some elements of the GUI as shown in FIGS. 1 to 23 are described here mostly to ease comprehension. In a professional use system there should be known contemporary forms of online help, such as a tutorial, context sensitive help, and tooltips, of such nature as supported by the user interface object platform that is being employed. Yet, many technology literate operators (called users in most literature) would be able to recognize standard user interface elements, make sense of them, and start using them, neither consulting any help system nor any documentation.

FIG. 1 comprises a few standard user interface elements that are neither innovative nor of elevated importance to the present invention: Title bar 101. Menu bar 102, with menus File, Edit, View, Tools, and Help. Formatting toolbar 103, with items to control font, font size, and font style.

The following user interface elements are more essential to the functioning of the present invention: The (plain old) Edit tab 132, the XML tab 133, the Preview tab 134, and the Access tab 135.

Figure 3:
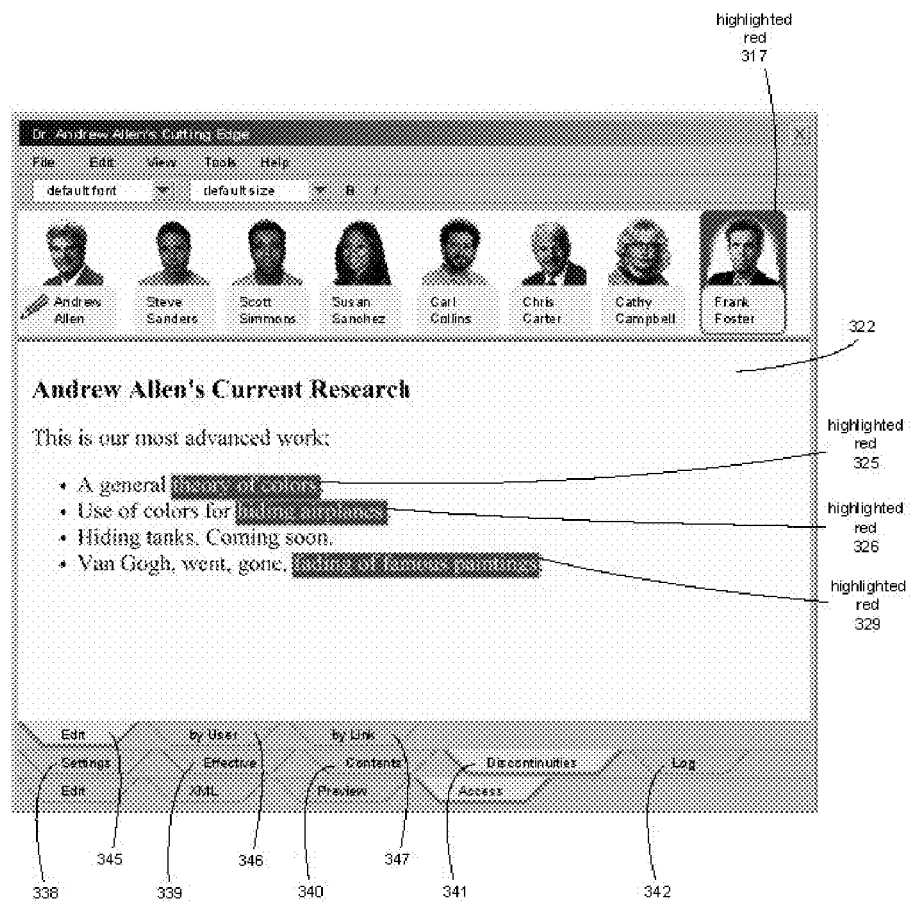
FIG. 3: When beginning review, as initial default, distinct red highlighting alerts the operator to who is the user (or the set of users) who would have the most problems and which are all the hyperlinks such user would not be able to follow.
Figure 8:
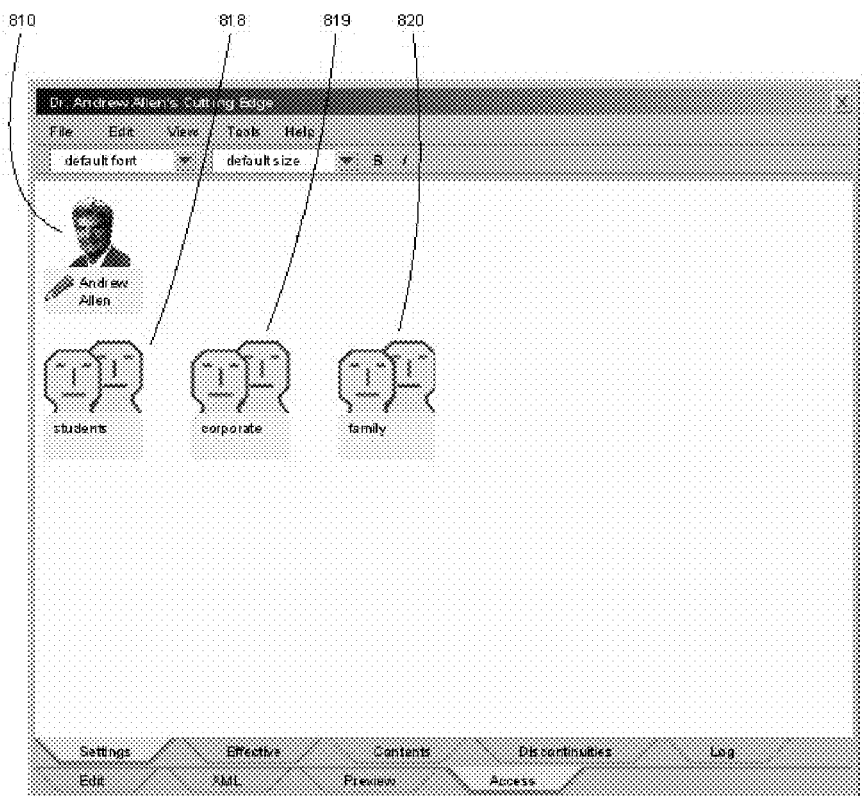
FIGS. 8 to 9: So far having recognized an apparent lack of authorization of a specific user to access any of the other documents linked from the current document, the operator chooses to remove a group from the current document's access settings.
Figure 9:
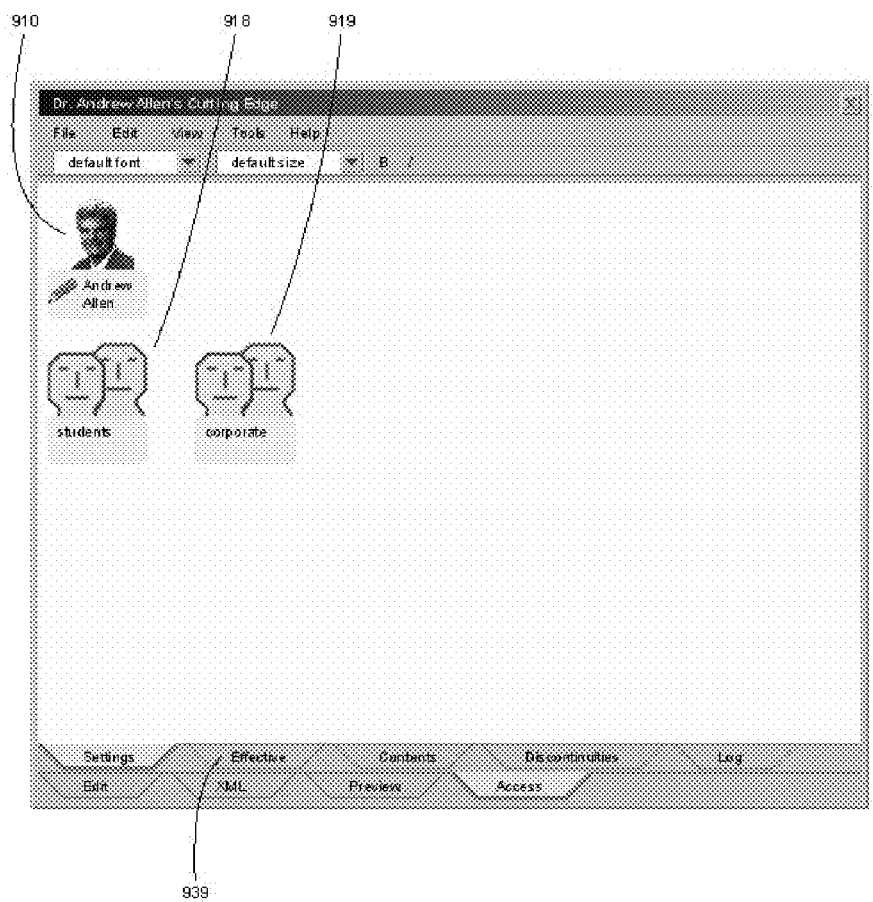
Figure 10:
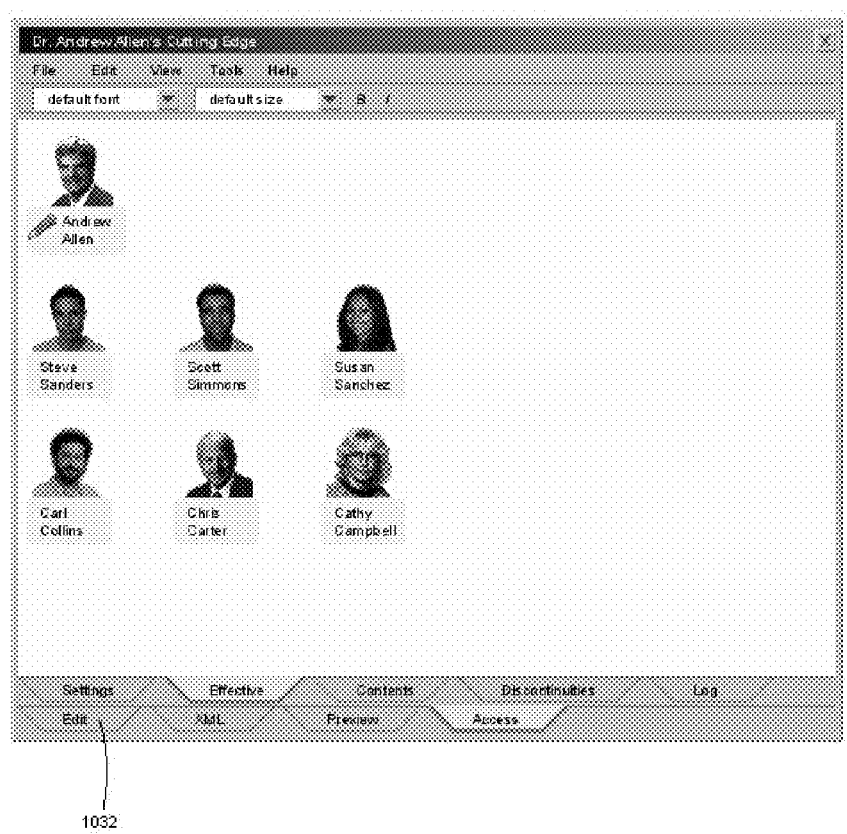
FIG. 10: The operator can visually verify the effect of removing the group, i.e. the problematic user is no longer authorized to access the current document.

FIG. 3 discloses two more levels of tabs: Hierarchically under (visually above) the Access tab there are the Settings tab 338, the Effective tab 339, the Contents tab 340 (also 1640) (shorter name than full "Access Dependent Contents"), the Discontinuities tab 341 (shorter name than correct "Discontinuous Hyperlinks"), and the Log tab 342. Operators should easily understand e.g. that by first selecting the Access tab, then the Settings tab the display should switch to access settings, as shown in FIGS. 8 to 9. One could continue when the Access tab is selected already, then selecting the Effective tab should switch to a display of who effectively is allowed to access the current document, as shown in FIG. 10.

Hierarchically under (visually above) the Discontinuities tab there are another (a discontinuous-hyperlinks-specific) Edit tab 345 (also 1645), the "by User" tab 346, and the "by Link" tab 347. This second (discontinuous-hyperlinks-specific) Edit tab (actually its corresponding panel) provides functionality (context sensitive popup menus and more) for editing related to discontinuous hyperlinks rather than (plain old) general purpose text document editing.

The tabs can be considered as organized in a hierarchy, possibly but not necessarily a tree. Each one (actually its corresponding panel) can provide a view of the current document or related to the current document.

Navigation between tabs does not necessarily have to require consequential clicking. Shortcut keys are a known technique that could be applied for navigation.

While commonly requested by the operator, navigation between tabs does not necessarily have to be specifically requested by the operator. It should be possible to switch to a different tab when the operator requests an operation that is better done in that different tab (actually in its corresponding panel). One example is if the operator (if so permitted in an installed implementation in the specific circumstances) in Access tab in Effective tab selects a user and issues a command to delete him, if then an embedded expert system (or other code) determines what action would have to be taken with access control settings for the current document (e.g. remove a group, or several steps), then it may be appropriate to automatically switch to Access tab to Settings tab in order to conduct interaction with the operator and to display feedback about any action taken.

The effective set of read authorized users is represented in FIG. 1 as its elements in iconic form, consisting of the author (and current operator) Andrew Allen 110, whose write authorization is indicated by a small likeness of a green pencil, Steve Sanders 111, Scott Simmons 112, Susan Sanchez 113, Carl Collins 114, Chris Carter 115, Cathy Campbell 116, and Frank Foster 117.

Example GUI Step by Step

FIG. 1: The operator has authored a document which contains hyperlinks to other documents and which will be available for access by other users.

The operator (the author) already has chosen who he wants to be able to read the document. Possibly he has done so in the Access tab. Now a compact display 108 of who 110, 111, 112, 113, 114, 115, 116, 117 effectively is allowed to access the current document is between the lowest toolbar 103 and the document contents display region 122.

The operator has typed the contents of the document and has used convenient tools to make hyperlinks 125, 126, 129. Other than plain text, hyperlinks are in blue font and underlined.

In the document there are four list items, marked by four bullet symbols. The first list item contains a hyperlink 125 to publications/colortheory. The second list item contains a hyperlink 126 to publications/camouflage. The third list item 128 is plain text, without any hyperlink. The fourth list item contains a hyperlink 129 to publications/vangogh. If curious, one can see the document's XML listed above in section "Example of Access Dependent Contents" or in FIG. 23.

This mode (i.e. the operator working inside the panel of currently selected Edit tab 132) can be called plain old editing mode (POEM).

The operator (the author) now wants to save the document.

Figure 2:
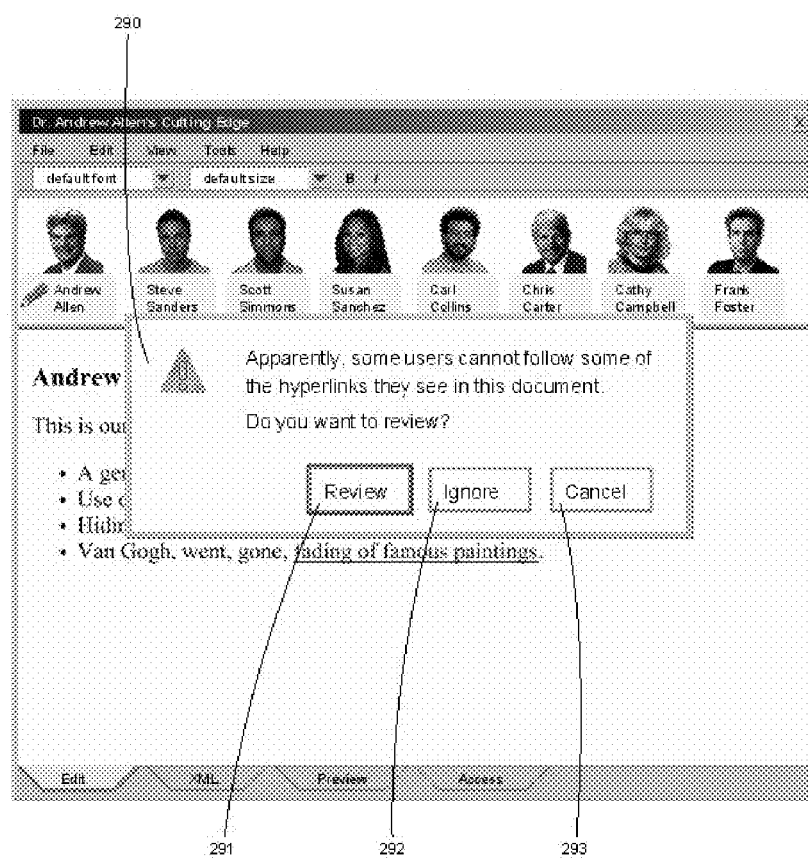
FIG. 2: When the operator tries to save the document, a notification appears to tell that some users would not be able to follow some of the hyperlinks from the document.

FIG. 2: When the operator tries to save the document, a notification 290 appears to tell that some users would not be able to follow some of the hyperlinks from the document.

The notification is worded in cautiously weighed lay terms: "Apparently, some users cannot follow some of the hyperlinks they see in this document. Do you want to review?" with choices Review 291, Ignore 292, and Cancel 293.

If the operator chooses Ignore (if so permitted in an installed implementation in the specific circumstances) then the document would be saved with discontinuous hyperlinks in place. That is the default behavior of prior art. It requires the least amount of operator time, not counting potential real world consequences.

If the operator chooses Cancel then he can make changes without being guided through a review. This is something an experienced operator might want to do in some specific circumstances, when he thinks he knows what is going on and how to quickly fix it in a way he prefers.

In this example, however, the operator picks the default choice, which is Review.

FIG. 3: When beginning review, as initial default, distinct red highlighting alerts the operator to who is the user (or the set of users) who would have the most problems and which are all the hyperlinks such user would not be able to follow.

This display has been designed into this place in order to be user friendly in most situations, in order to give an optimal mix of information and possible control in a single display. For further understanding of why in this example exactly these specific items are being highlighted, one might want to peek at FIGS. 5 and 6 as well, which is what the operator will do next in this example.

Figure 17:
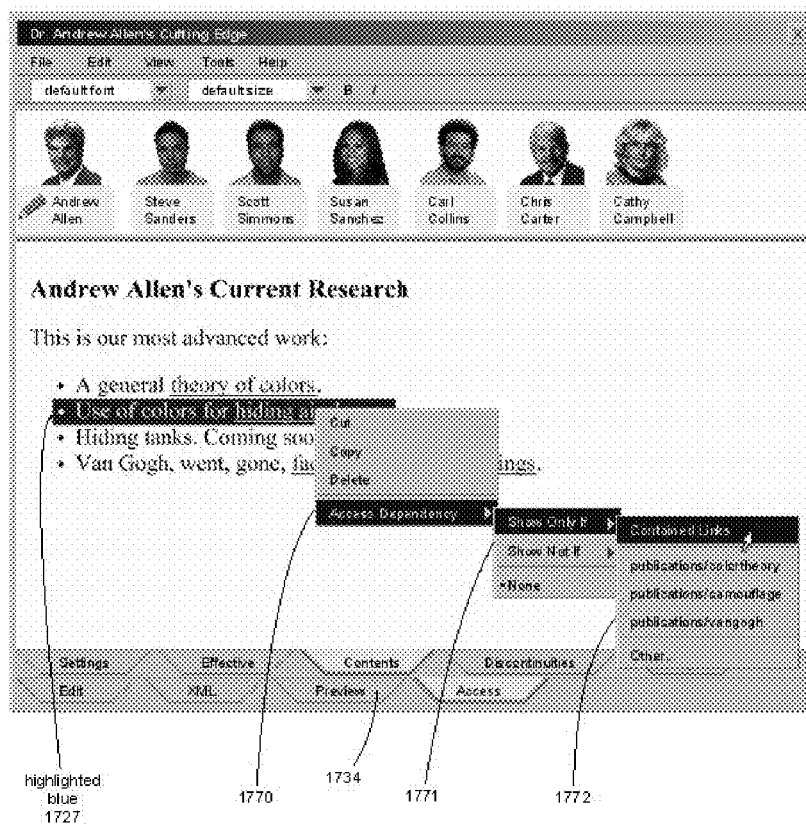
FIG. 17: The operator in the document selects the list item which contains the problematic hyperlink and by context sensitive popup menu sets it to be access dependent contents, only to be shown if the accessing user is authorized to access the linked document too.
Figure 20:
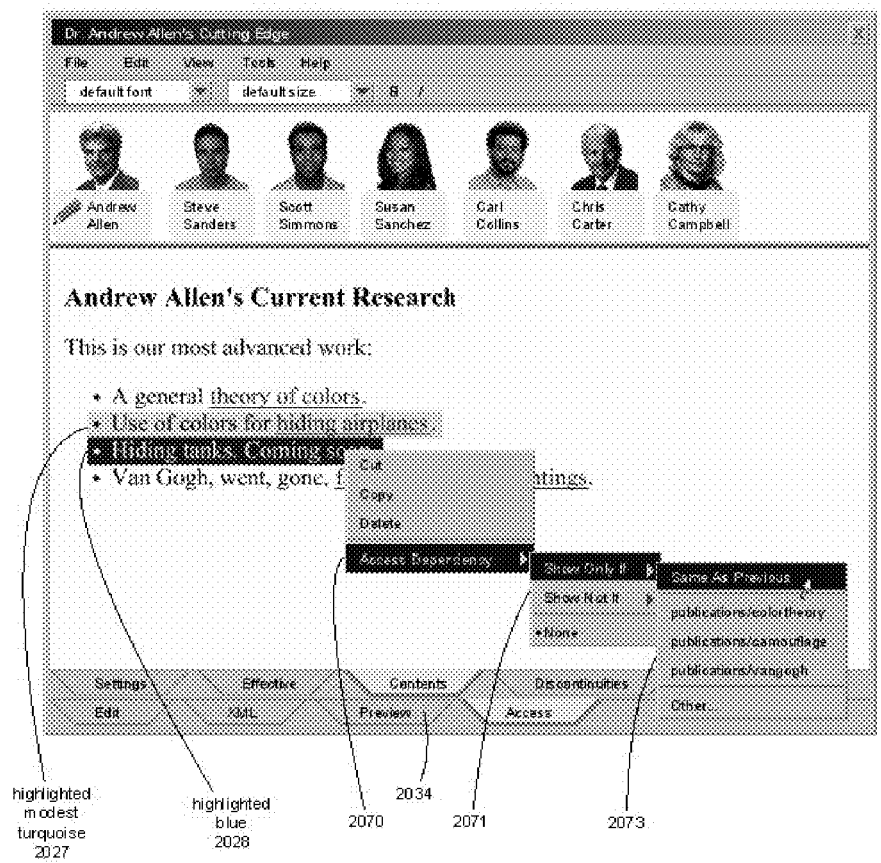
FIG. 20: Having seen that too much information is exposed, the operator chooses to select the list item directly after the previously problematic hyperlink and by context sensitive popup menu sets it to be access dependent contents also, only to be shown if the same condition is met as for the access dependent contents before it, which here is highlighted in modest turquoise.

An advantage of this display is that it allows to navigate to other views, while still being visually most similar to plain old editing mode: The operator could select an individual hyperlink for further analysis or action, as shown in FIGS. 4, 7, 13, 14 and 15, and arguably as shown in FIGS. 17 and 20 (in those instances after selecting then having switched to access dependent contents mode, possible at least by in Access tab switching to Contents tab 340, actually by a single click, but also possible to be switched automatically as part of execution of a command selected from a popup menu inside the panel of Edit tab 345). The operator could select an individual user for further analysis or action. The operator could select a summary of discontinuous hyperlinks sorted by user by switching to "by User" tab 346. The operator could select a summary of discontinuous hyperlinks sorted by hyperlink or sorted by hyperlink URI by switching to "by Link" tab 347.

In this example, at this stage, Frank Foster 317 is "the user with the most problems". All three hyperlinks appear to be problematic for him. Plenty of bright red highlighting 325, 326, 329 dots the document contents display region 322.

Figure 4:
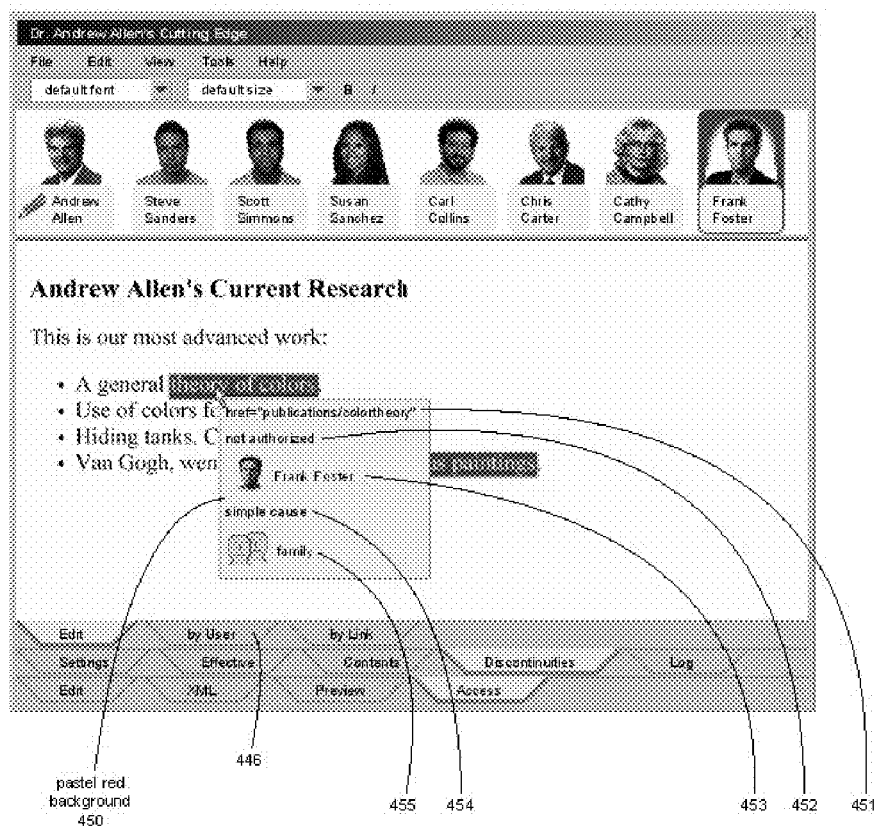
FIG. 4: A pastel red popup hint at the mouse cursor arrow hovering at a hyperlink displays details about its discontinuous nature.

FIG. 4: A pastel red popup hint at the mouse cursor arrow hovering at a hyperlink displays details about its discontinuous nature.

A hint 450 appears while the operator points at a hyperlink. It displays the locator attribute 451, which shows its URI, href="publications/colortheory". Next to a label 452 "not authorized" it displays who 453 effectively is not allowed to access the referenced document. If possible to determine and to explain concisely, then next to a label 454 "simple cause" it displays which entity 455 in access control settings causes the hyperlink to be discontinuous.

In this example it was possible with a simple algorithm to determine that the hyperlink would effect discontinuity for all members of group "family", which is an entry in access control settings for the current document. As listed above, in section "Example GUI", in this example that group consists of only one member, i.e. Frank Foster.

If interested, one could consider an alternative scenario: If group "family" would consist of both Frank Foster and Andrew Allen then "simple cause" would be group "family" nonetheless. Then, user Andrew Allen also being a distinct entry in access control settings for the current document, as shown in FIGS. 8 to 9, wouldn't directly affect causality one way, but it would allow deletion of group "family" from access control settings for the current document without affecting user Andrew Allen.

Figure 14:
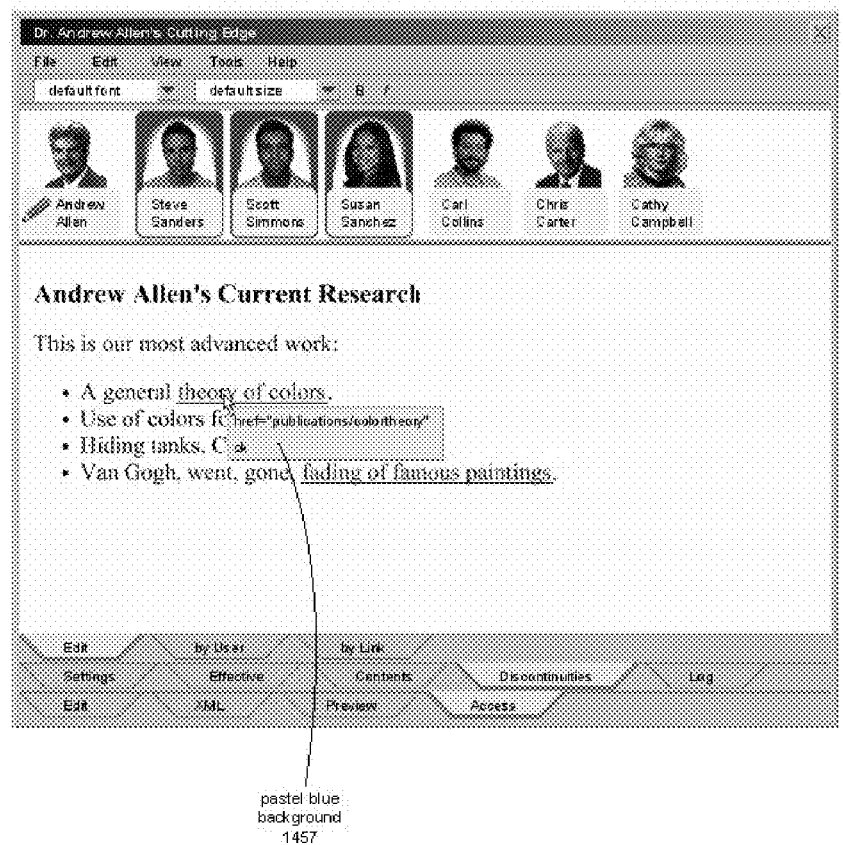
FIG. 14: A pastel blue popup hint at the mouse cursor arrow hovering at a hyperlink shows it appears to be well.
Figure 15:
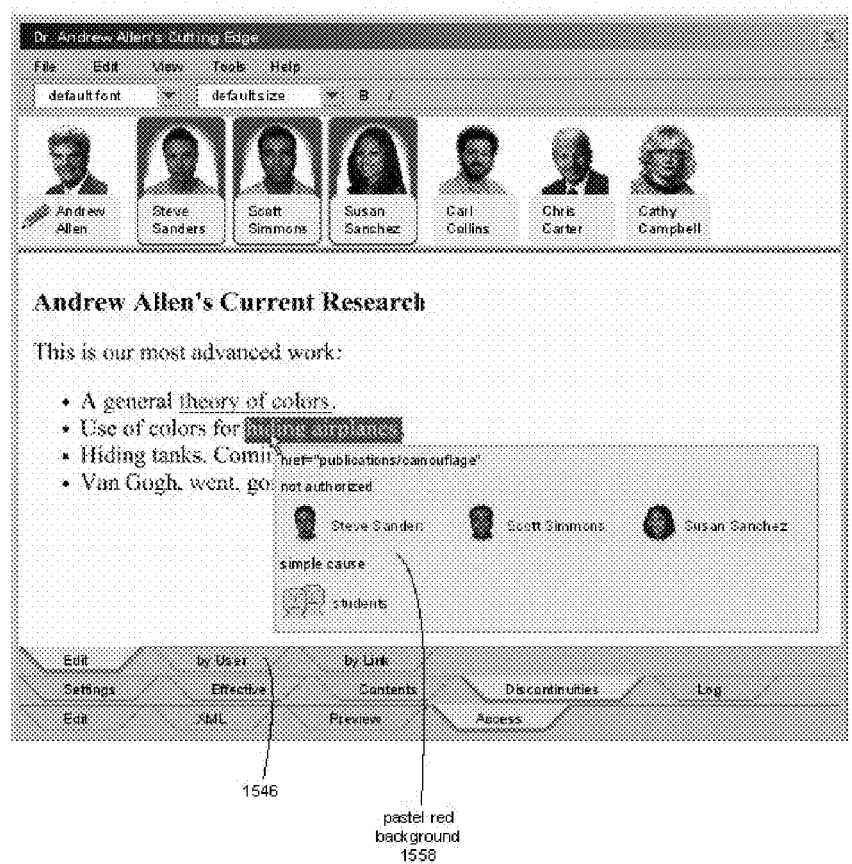
FIG. 15: A pastel red popup hint at the mouse cursor arrow hovering at a hyperlink displays details about its discontinuous nature.

An example for a discontinuous hyperlink affecting more users is in FIG. 15, hint 1558. A hint for a continuous hyperlink is in FIG. 14, hint 1457.

The operator should be in control of which hint to look at, and for how long, as he should be in control of where he moves the mouse cursor, i.e. whether he points at a specific hyperlink or at any hyperlink at all. If this functionality would be provided in plain old editing mode it might be causing user interface overload (be obnoxious), specifically if active at all times. It could be made tolerable by limiting it to being activated by some kind of event or condition, e.g. when a modification key is being held down. As shown here, however, it is quite practical (pleasant) to use, as it is on by default only in Discontinuities tab in Edit tab.

From an implementation point of view, a hint e.g. could be activated by an event or by a condition. For a GUI object (for a hyperlink) there could be something like a "mouseCursorEntered" event which would be handled by an "onMouseCursorEntered" handler. Different GUI libraries have different but similar sets of standard events and handlers. In a handler or in other code there could be a condition such as "if mouse coordinates are inside this hyperlink region then".

Figure 5:
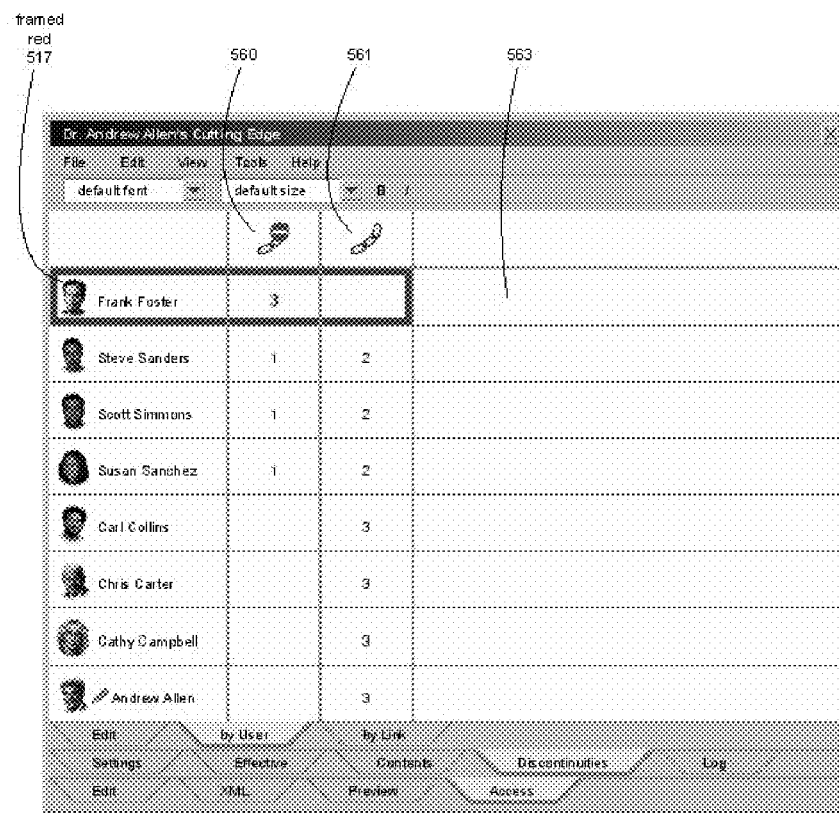
FIG. 5: A simple summary table for the document allows an overview of the quantity of problems.

In this example, the operator selects the "by User" tab 446, which takes him to FIG. 5.

FIG. 5: A simple summary table for the document allows an overview of the quantity of problems.

While it can be advantageous to take immediate action, sometimes an operator is better off checking, or simply wants to check, how many more problems there will be. Maybe if there are too many problems he would take other action than if there is only one discontinuous hyperlink.

The first column displays users. The second column, headed by an icon 560 for discontinuity ("do not enter"), displays the number of hyperlinks which would effect discontinuity for the user in each row. The third column, headed by an icon 561 for a continuous hyperlink (a chain), displays the number of hyperlinks which would effect continuity for the user in each row. The fourth column appears empty 563, but clicking in it should add more information, as shown in FIG. 6.

Table objects have become common in widely used GUI libraries. Some could provide functionality to allow the operator to rearrange columns. Another common technique is to allow the operator to sort rows differently by clicking in column headers.

Default options shown here include: Sort (rows) to show largest number of discontinuity effecting hyperlinks first, i.e. on top. Show discontinuity effecting hyperlinks column (problems) before (to the left of) continuity effecting hyperlinks (no problems). Instead of zero display an empty cell. Highlight the user 517 (or the users) with the most discontinuity effecting hyperlinks with a red frame and a red number of discontinuity effecting hyperlinks.

Figure 6:
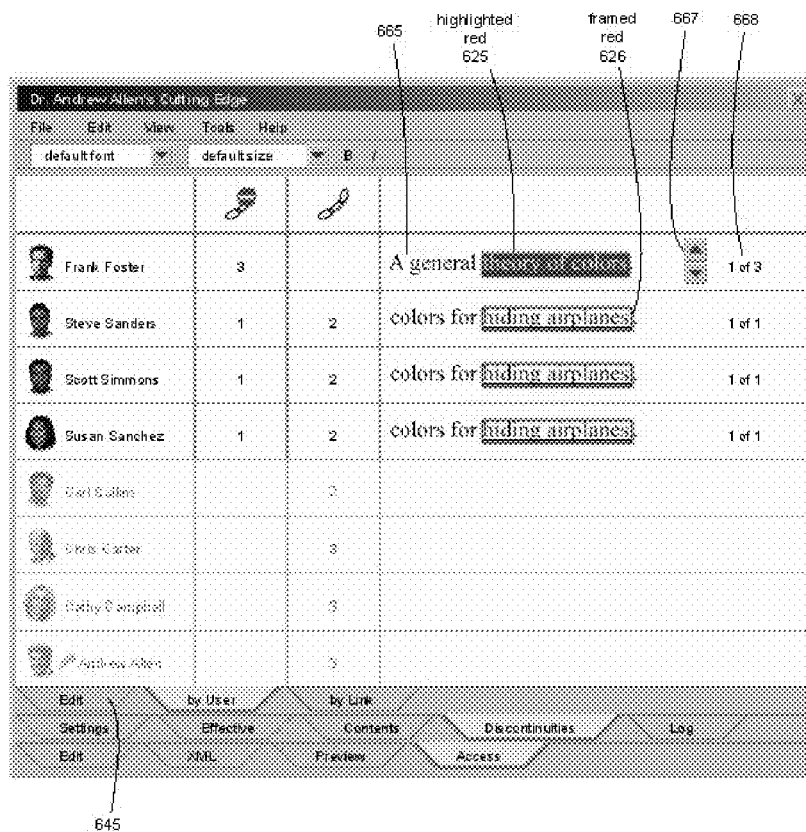
FIG. 6: A more detailed summary table shows and allows browsing of and navigation to each user individually as well as then for each user browsing of and navigation to each problematic hyperlink individually.

One possible reason to provide a display as in FIG. 5 in addition to a display as in FIG. 6 might be to allow super fast switching to (and away from) and reviewing of a display as in FIG. 5, by not even spending any CPU time trying to (correctly) render additional information as in FIG. 6.

FIG. 6: A more detailed summary table shows and allows browsing of and navigation to each user individually as well as then for each user browsing of and navigation to each problematic hyperlink individually.

Additional options introduced here include: Cells in the fourth column for each user display discontinuity effecting hyperlinks 625, 626, with a little bit of context 665, if any. Scroll arrows 667 allow iteration through discontinuity effecting hyperlinks for each user with more than one 668 discontinuity effecting hyperlink. If zero discontinuity effecting hyperlinks for a user then that user's row is dimmed, which helps to ease comprehension of the quantity of problems, if (rows have been) sorted to show largest number of discontinuity effecting hyperlinks first.

As an alternative it should be possible to coalesce the fourth column entries for users Steven Sanders, Scott Simmons, and Susan Sanchez, because they have the same contents. It also should be possible to coalesce their second and third column entries. It specifically should be possible when software can determine that their entries are based on the same logic, in this example on their membership in group "students". It should be possible to use a combination of tree and table (e.g. TreeTable from the Sun Developer Network article "Creating TreeTables in Swing" by Philip Milne) to show their common circumstances as members of group "students" while allowing folding. Another item to be foldable in such tree table should be the set of users without discontinuity effecting hyperlinks.

There should be a context sensitive popup menu that allows the operator when pointing at user Frank Foster to delete him from access control settings for the current document.

In this example the operator in his mind isn't ready for that kind of step yet. Inside the cell in the fourth column of the row of Frank Foster he clicks in the context 665 of the selected discontinuous hyperlink 625, which takes him to FIG. 7.

Figure 7:
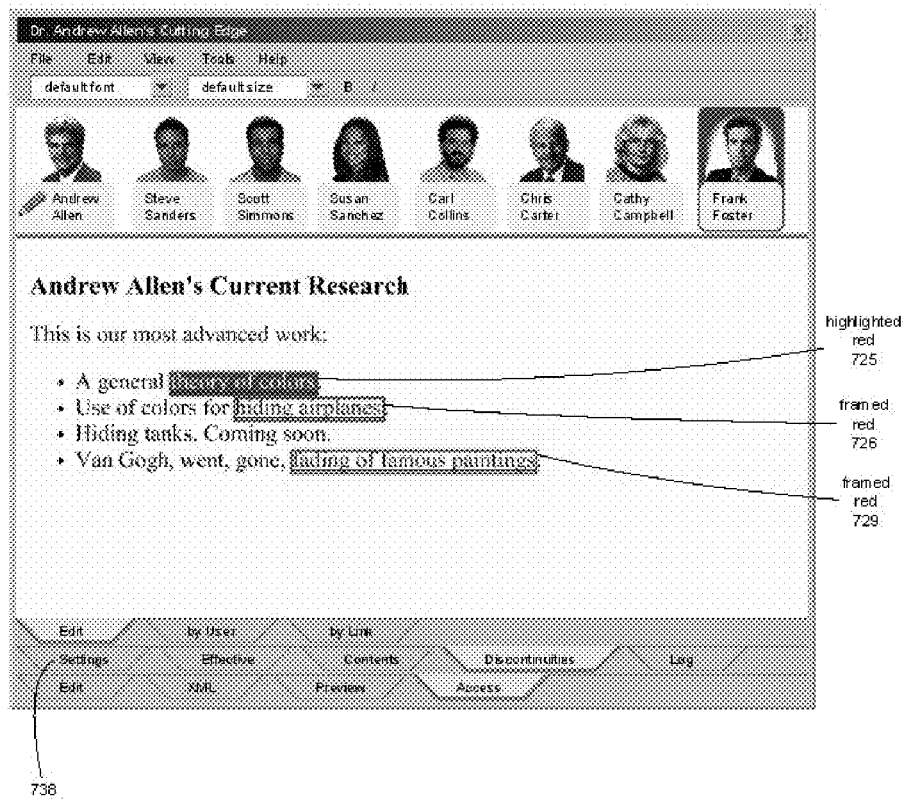
FIG. 7: The operator has selected the first problematic hyperlink, whereby it is highlighted as well as the user (or the set of users) who would not be able to follow it is highlighted too.

FIG. 7: The operator has selected the first problematic hyperlink, whereby it is highlighted as well as the user (or the set of users) who would not be able to follow it is highlighted too.

Similar to FIG. 3, but only one hyperlink 725 is selected. The selected hyperlink is highlighted red. Other problematic hyperlinks 726, 729 are framed red, which is less intense yet still noticeable.

Figure 13:
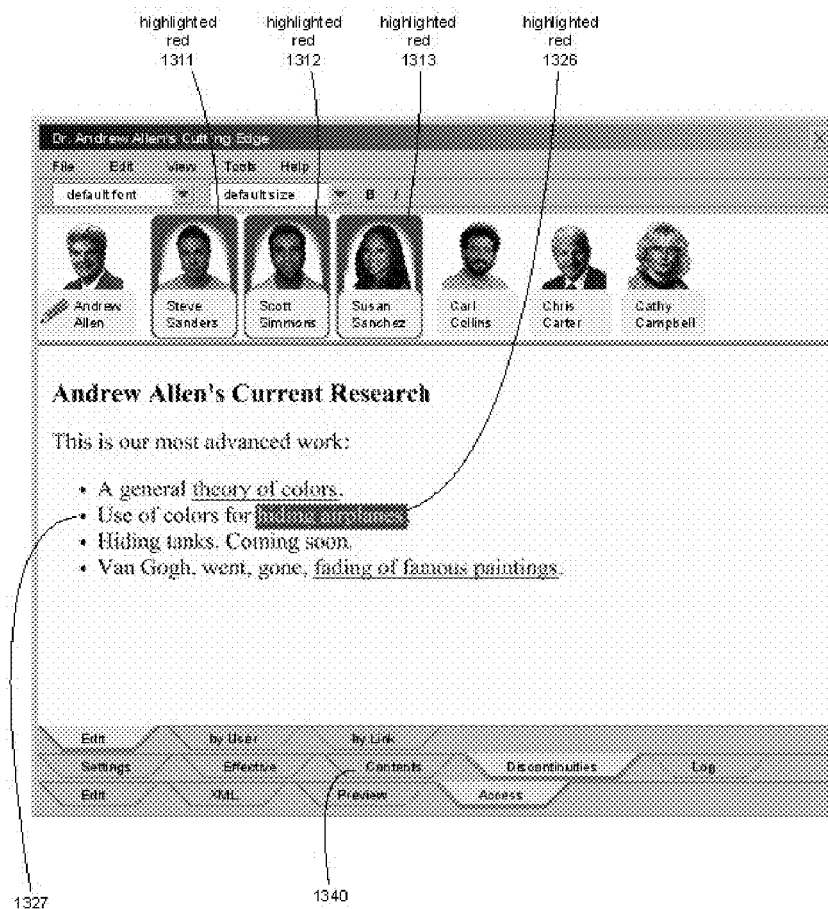
FIG. 13: When beginning another review, as initial default, distinct red highlighting alerts the operator to who is the set of users who would have problems and which is the hyperlink such users would not be able to follow.

Not to worry, in this example the operator will do something with selected discontinuous hyperlinks from FIG. 13 onward.

For now, in this example, the operator has seen enough to make up his mind that he does not want to give Frank Foster access to the current document at all. He actually does not want to give group "family" access to the current document at all. There should be a context sensitive popup menu that allows the operator when pointing at user Frank Foster to delete him from access control settings for the current document. Because of his personal level of experience, however, in this example the operator selects the Settings tab 738, which takes him to FIG. 8.

FIGS. 8 to 9: So far having recognized an apparent lack of authorization of a specific user to access any of the other documents linked from the current document, the operator chooses to remove a group from the current document's access settings.

FIG. 8 shows access control settings for the current document. As an individual user, the author (and current operator), Andrew Allen 810 (also 910), is authorized to write, as indicated by a small likeness of a green pencil. Groups "students" 818 (also 918), "corporate" 819 (also 919), and "family" 820 are authorized to read.

The operator selects group "family" and deletes it, which results in FIG. 9.

Familiar with this kind of system, and because he wants to know what is going on, now the operator selects the Effective tab 939.

FIG. 10: The operator can visually verify the effect of removing the group, i.e. the problematic user is no longer authorized to access the current document.

The effective set of read authorized users is represented as its elements in iconic form, consisting of the author (and current operator) Andrew Allen, whose write authorization is indicated by a small likeness of a green pencil, Steve Sanders, Scott Simmons, Susan Sanchez, Carl Collins, Chris Carter, and Cathy Campbell.

In this example, a few seconds after his attempt to save the document, the operator feels he wants to go back and see his document. He doesn't want to deal with access control settings any longer, be it easy or not, he doesn't want to see anything red any more. He selects the (plain old) Edit tab 1032, which takes him to FIG. 11.

Figure 11:
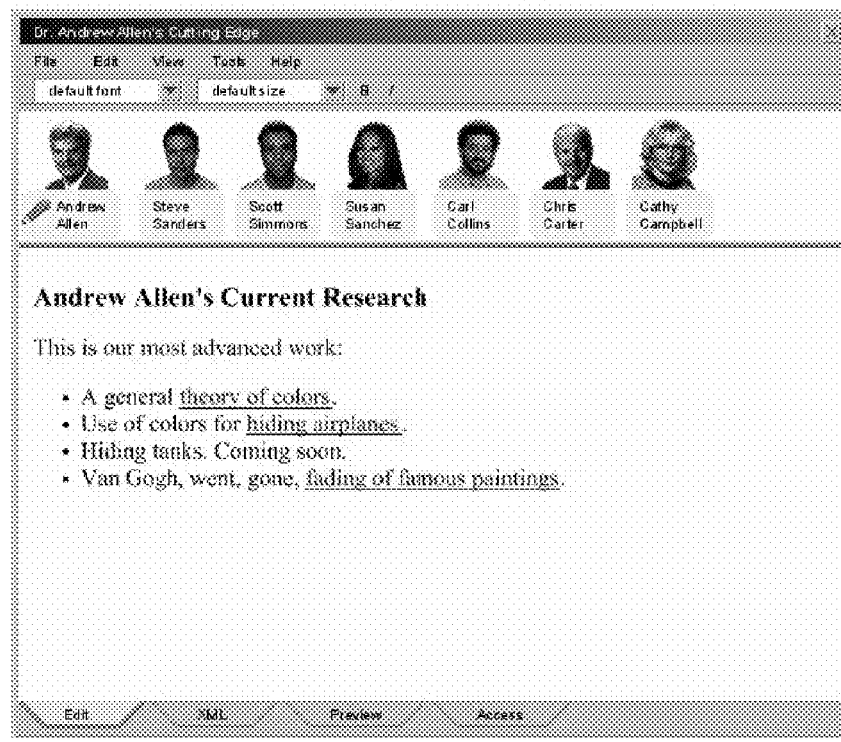
FIG. 11: The operator has chosen to switch back to plain old editing mode.

FIG. 11: The operator has chosen to switch back to plain old editing mode.

Figure 12:
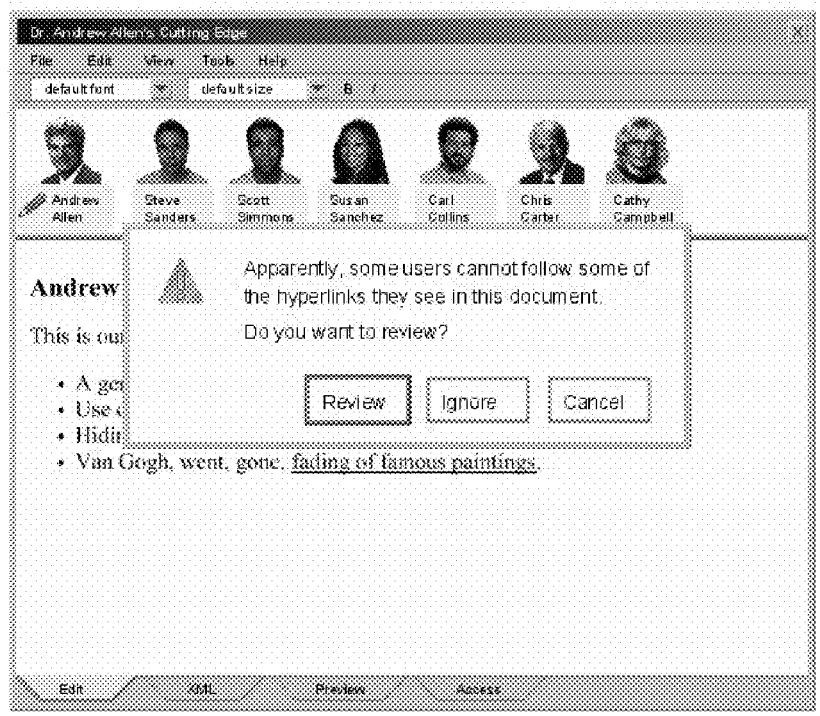
FIG. 12: When the operator once again tries to save the document, a notification appears again to tell that some users would not be able to follow some of the hyperlinks from the document.

FIG. 12: When the operator once again tries to save the document, a notification appears again to tell that some users would not be able to follow some of the hyperlinks from the document.

FIG. 13: When beginning another review, as initial default, distinct red highlighting alerts the operator to who is the set of users who would have problems and which is the hyperlink such users would not be able to follow.

Similar to FIG. 3, but a different balance of items. Apparently only one problematic hyperlink 1326, which appears to involve three users 1311, 1312, 1313, i.e. Steve Sander, Scott Simmons, and Susan Sanchez.

A very logically thinking operator, who at the same time does not double check much, maybe in order to get things done quickly, at this point could recognize (and act on the recognition) that he could proceed to set the second list item 1327 to be access dependent contents. The second list item is an element that contains the one problematic hyperlink 1326, and it would be a good, viable, and reasonable choice for access dependency. In this example, the operator will get to doing that in FIG. 17, after doing some double checking in FIGS. 14 to 16.

Because it is so easy, the operator points the mouse cursor over hyperlinks, just long enough to understand the hints which are popping up.

FIG. 14: A pastel blue popup hint at the mouse cursor arrow hovering at a hyperlink shows it appears to be well.

The hint 1457 displays the locator attribute, which shows its URI, href="publications/colortheory". Next, it displays a label "ok".

FIG. 15: A pastel red popup hint at the mouse cursor arrow hovering at a hyperlink displays details about its discontinuous nature.

The hint 1558 is similar to but different than the one in FIG. 4. It displays the locator attribute, which shows its URI, href="publications/camouflage". Next to a label "not authorized" it displays who effectively is not allowed to access the referenced document, i.e. Steve Sander, Scott Simmons, and Susan Sanchez. If possible to determine and to explain concisely, then next to a label "simple cause" it displays which entity in access control settings causes the hyperlink to be discontinuous.

In this example it was possible with a simple algorithm to determine that the hyperlink would effect discontinuity for all members of group "students", which is an entry in access control settings for the current document. As listed above, in section "Example GUI", in this example that group consists of three members, i.e. Steve Sander, Scott Simmons, and Susan Sanchez.

Figure 16:
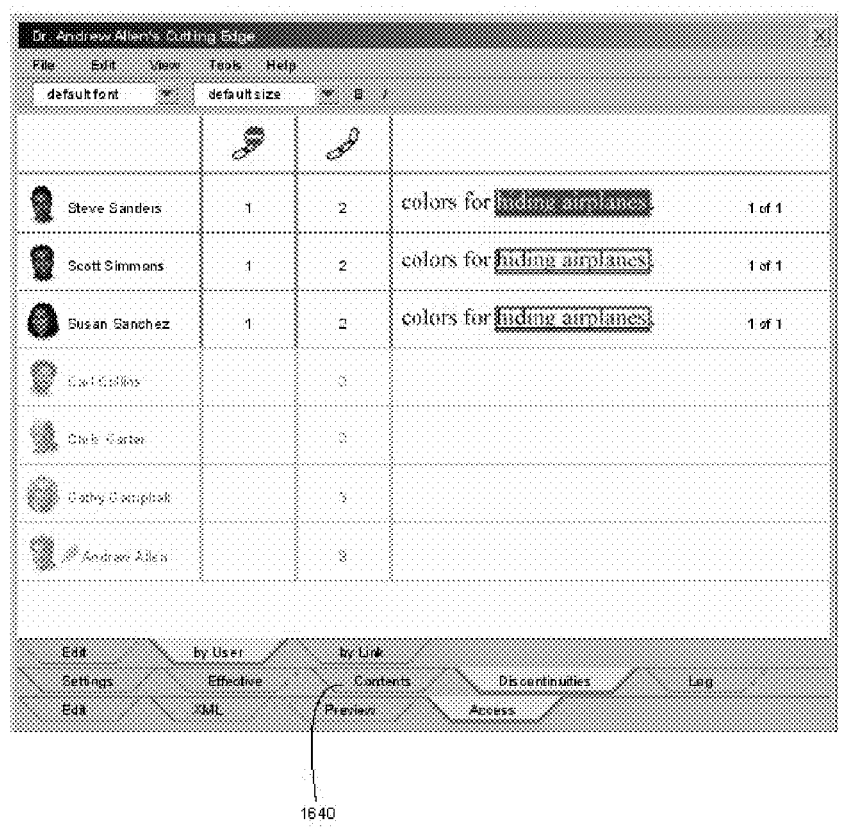
FIG. 16: A detailed summary table shows less problems left to fix, with the only one problematic hyperlink being the same for each of the three problematic users.

In this example, the operator selects the "by User" tab 1546, which takes him to FIG. 16.

FIG. 16: A detailed summary table shows less problems left to fix, with the only one problematic hyperlink being the same for each of the three problematic users.

Similar to FIG. 5, but less discontinuity effecting hyperlinks for less users. All problems appear to be from the same one discontinuous hyperlink.

In this example the operator finally in his mind is ready to proceed to solving the problem at hand by setting access dependent contents. Inside a cell in the fourth column he clicks in the context of its discontinuous hyperlink, which takes him (back) to the same as FIG. 13 (which maybe for better illustration here would have deserved repetition as an identical figure between 16 and 17). There he selects the Contents tab 1340, which takes him to FIG. 17.

FIG. 17: The operator in the document selects the list item which contains the problematic hyperlink and by context sensitive popup menu sets it to be access dependent contents, only to be shown if the accessing user is authorized to access the linked document too.

Whether to allow many different paths of control and of user interaction to lead to here or whether to allow only a few should be decided by balancing programming effort, insights from operator observation ("user observation" is an established term), and maybe some apparently trivial measures such as number of items in context sensitive popup menus.

A number of commands could be implemented that if available and selected from a context sensitive popup menu then automatically make specific kinds of selections. E.g. from a hyperlink one could automatically select the enclosing element, which on execution could be found to e.g. be a paragraph, a list item, a table cell, etc.

In this example, the operator with familiar tools and commands, similar or identical to plain old editing mode, has selected the second list item 1727, which now is highlighted blue, and which contains the one problematic hyperlink, which may have been preselected from operator interaction in FIG. 16.

The operator has invoked a context sensitive popup menu 1770 which is specific to access dependent contents mode. The menu shows items Cut, Copy, Delete, a separator, and Access Dependency. From Access Dependency, as activated by operator choice, a submenu 1771 shows items Show Only If, Show Not If, a separator, and selected None. From Show Only If, as activated by operator choice, a submenu 1772 shows items Contained Links, a separator, publications/colortheory, publications/camouflage, publications/vangogh, a separator, and Other . . . .

If something is in the clipboard to paste, then Paste might be an item too. Selection marks in the menus should show if and how access dependency has been set already. Initially it would be a selection mark at None.

What is listed in the submenu off Show Only If depends on context. In this example the item Contained Links shows because there is at least one hyperlink inside the selected text. The list of three URIs in this example is the list of all URIs found in hyperlinks anywhere in the current document. It is shown in case an operator wants to explicitly use any of them for access dependency settings. Other . . . should lead to a dialog or to an area to type in, paste in, drag in, or otherwise enter a URI, ideally also allowing entry from a general purpose browser.

The operator invokes the Contained Links command. In this example, using edit time evaluation, not necessarily of interest to non-technical operators, this causes a change in markup language from <li> to <li adc:onlyIf="publications/camouflage">.

In the inventor's preferred embodiment, no matter how menu items and other command user interface items would be named, conditions are explicitly stored with URIs. This is where "edit time evaluation" is being used. This is in contrast to "access time evaluation". At least one example for access time evaluation is listed above in section "Example of Access Dependent Contents", specifically <li adc:onlyIfRefs="true">. Explicitly storing URIs doesn't imply making them absolute or otherwise modifying them. In general, editors may be set to prefer making relative URIs, but URIs in conditions in most cases should be identical to URIs in hyperlinks, whichever form those are.

Given contemporary workstation processing power, while editing a document almost anything can be looked at by an expert system or similar code. Noteworthy (new) circumstances (as a result of changes being made during editing) being recognized (while editing) could be flagged in a non-blocking (e.g. non-modal display region) or in a blocking (e.g. modal dialog) manner. Noteworthy circumstances might include: If an onlyIf attribute doesn't match any enclosed reference. If an incomplete sentence remains through access dependent contents. If discontinuous hyperlinks are left over even after access dependency. If, reversely, after editing a hyperlink's reference URI then a previously set access dependency's condition URI no longer matches, in that case possibly asking the operator whether to update (match), or without asking automatically updating (matching) the access dependency's condition URI to the newly changed hyperlink's reference URI.

When the operator invokes the None command then there could be a confirming dialog presented, at least if something would become newly visible to some users. Such confirmation, however, might be causing unnecessary user interface overload. Preview mode as in FIGS. 18, 19, 21, and highlighting of access dependent contents as in FIG. 20 are providing good visual feedback anyway.

By his personal experience the operator knows that just setting something might not have the expected effect. He chooses to go to preview mode by selecting the Preview tab 1734, which takes him to FIG. 18.

Figure 18:
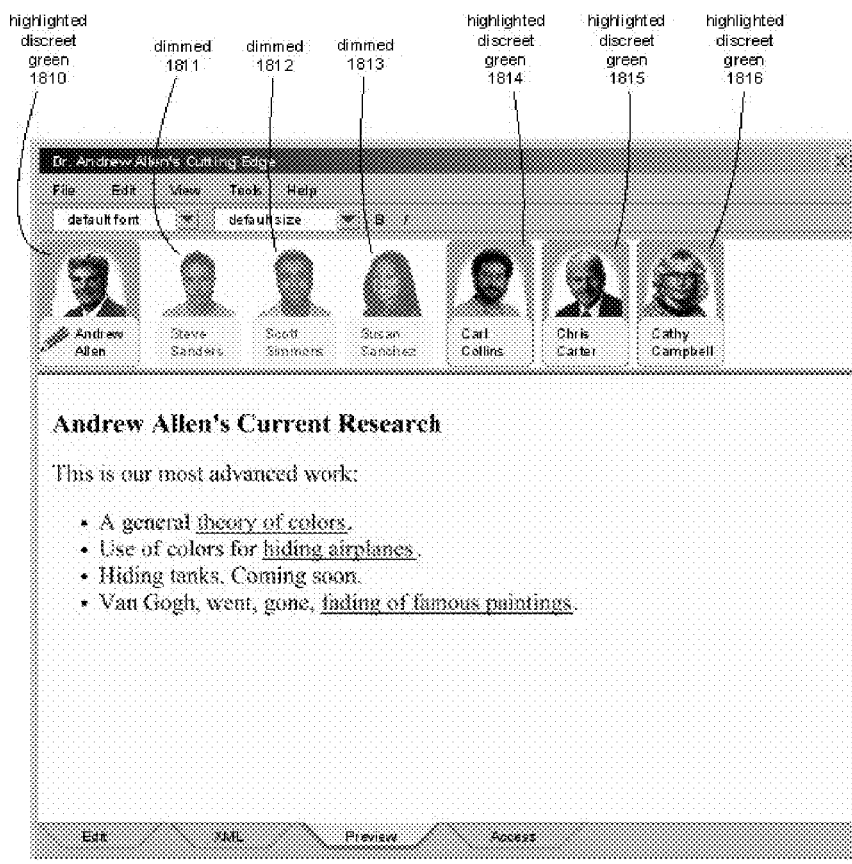
FIG. 18: The operator has switched to preview mode, which as initial default shows what the operator himself would see, whereby all users who would see the same are highlighted in discreet green.

FIG. 18: The operator has switched to preview mode, which as initial default shows what the operator himself would see, whereby all users who would see the same are highlighted in discreet green.

The operator himself 1810 can see the complete document. So can Carl Collins 1814, Chris Carter 1815, and Cathy Campbell 1816. That was logically predictable: Neither of these four users has shown up as having a problem with any hyperlink from the current document. Therefore, all of them would pass the test at adc:onlyIf="publications/camouflage", it being a test against a hyperlink from the current document.

Something different appears to be visible to other users, the iconic representations of whom are displayed dimmed, i.e. Steve Sanders 1811, Scott Simmons 1812, and Susan Sanchez 1813.

Noteworthily, Andrew Allen 1810 does not have exactly the same access privileges as Carl Collins 1814, Chris Carter 1815, and Cathy Campbell 1816, neither for the current document nor for the referenced documents, which he has authored himself too, for which he has write authorization while the other users have read authorization only. They have been selected into the same logical set (and therefore have been highlighted) because they would see the same, i.e. because access dependency in the current document evaluates the same for all of them.

Figure 19:
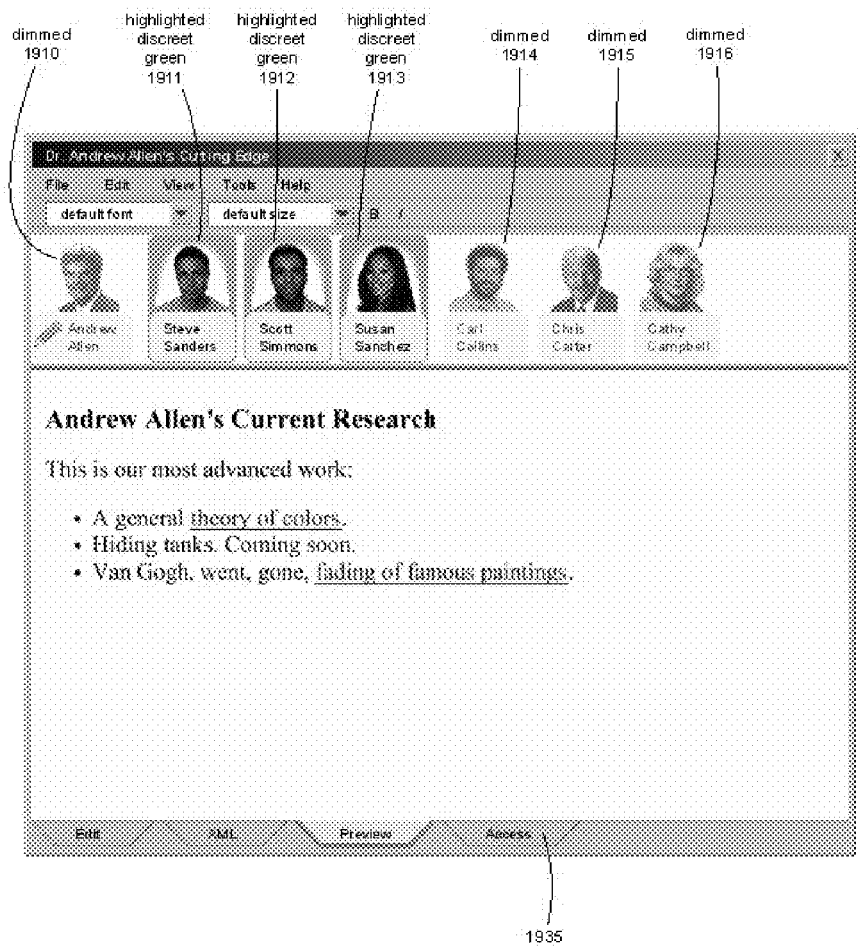
FIG. 19: In preview mode the operator has selected a different user, one of the formerly problematic users, whereby it shows what that user would see, and all users who would see the same are highlighted too.

The operator selects the iconic representation of Steve Sanders 1811, which takes him to FIG. 19.

FIG. 19: In preview mode the operator has selected a different user, one of the formerly problematic users, whereby it shows what that user would see, and all users who would see the same are highlighted too. The iconic representations of other users are displayed dimmed, i.e. the operator himself 1910 (also 2110), Carl Collins 1914 (also 2114), Chris Carter 1915 (also 2115), and Cathy Campbell 1916 (also 2116).

Three users, i.e. Steve Sanders 1911, Scott Simmons 1912, and Susan Sanchez 1913, apparently see the same edited down document: Their list has three items instead of four. Previously set access dependent contents now is not available in their view. That is a satisfactory result to see.

The operator now recognizes there is more text he should as much restrict as the successfully restricted list item "Use of colors for hiding airplanes." He recognizes his students should not see the list item "Hiding tanks Coming soon."

The operator first selects the Access tab 1935, then the Contents tab, which takes him to FIG. 20.

FIG. 20: Having seen that too much information is exposed, the operator chooses to select the list item directly after the previously problematic hyperlink and by context sensitive popup menu sets it to be access dependent contents also, only to be shown if the same condition is met as for the access dependent contents before it, which here is highlighted in modest turquoise.

The operator being the author he sees the complete document. In access dependent contents mode any and all access dependent contents is highlighted in modest turquoise 2027, except what is selected then is highlighted blue. A popup hint at the mouse cursor hovering at access dependent contents could display information about its access dependency settings.

In this example, the operator with familiar tools and commands, similar or identical to plain old editing mode, has selected the third list item 2028, which now is highlighted blue.

The operator has invoked a context sensitive popup menu 2070 which is specific to access dependent contents mode. The menu shows items Cut, Copy, Delete, a separator, and Access Dependency. From Access Dependency, as activated by operator choice, a submenu 2071 shows items Show Only If, Show Not If, a separator, and selected None. From Show Only If, as activated by operator choice, a submenu 2073 shows items Same As Previous, a separator, publications/colortheory, publications/camouflage, publications/vangogh, a separator, and Other . . . .

What is listed in the submenu off Show Only If depends on context. In this example the item Same As Previous shows because there is no hyperlink inside the selected text 2028, but there is immediately preceding access dependent contents 2027. The list of three URIs in this example is the list of all URIs found in hyperlinks anywhere in the current document. It is shown in case an operator wants to explicitly use any of them for access dependency settings. Other . . . should lead to a dialog or to an area to type in, paste in, drag in, or otherwise enter a URI, ideally also allowing entry from a general purpose browser.

The operator invokes the Same As Previous command. In this example, using edit time evaluation, not necessarily of interest to non-technical operators, this causes a change in markup language from <li> to <li adc:onlyIf="publications/camouflage">.

By his personal experience the operator knows that just setting something might not have the expected effect. He chooses to go to preview mode by selecting the Preview tab 2034, which takes him to FIG. 21.

Figure 21:
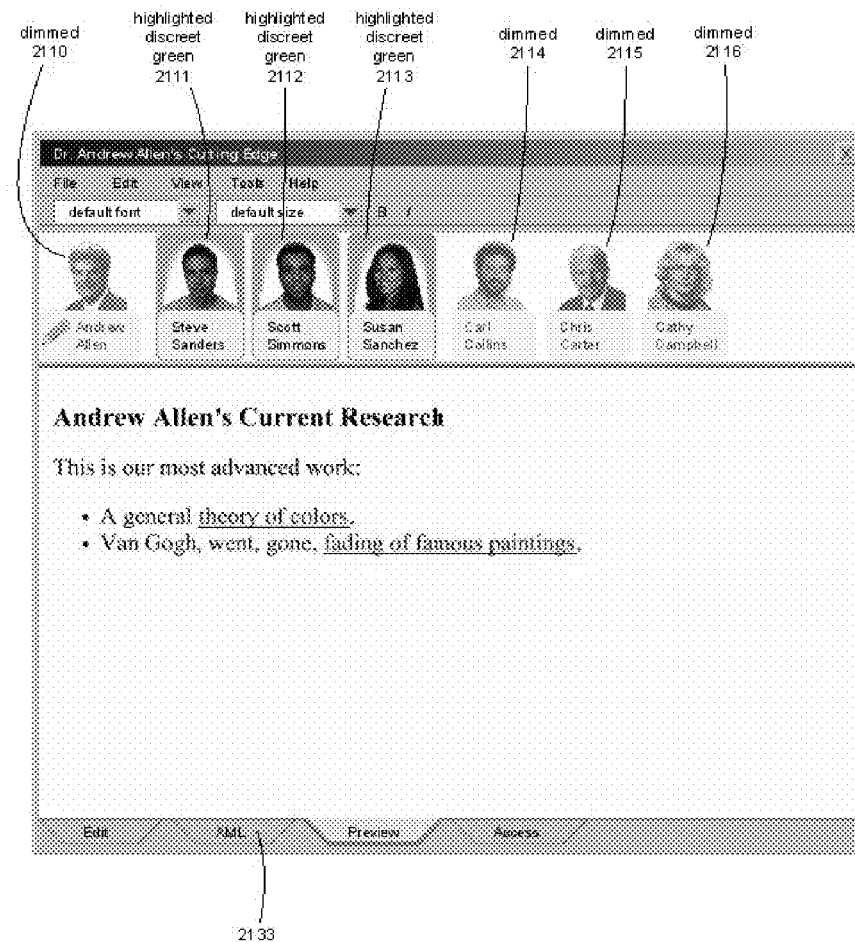
FIG. 21: The operator has switched back to preview mode and being satisfied with the visually verified effects of his modifications successfully saves the document.

FIG. 21: The operator has switched back to preview mode and being satisfied with the visually verified effects of his modifications successfully saves the document.

In this example the software has remembered which user (or users) the operator had selected in preview mode.

Three users, i.e. Steve Sanders 2111, Scott Simmons 2112, and Susan Sanchez 2113, apparently see the same edited down document: Their list now has two items instead of four. Previously set access dependent contents now is not available in their view, as expected.

As he has tried previously, the operator now uses a common user interface element to give the command to save the document, e.g. Ctrl-S to issue the Save command in the File menu. This time it succeeds.

Saving should be implemented as storing to a server. This should have the effect of making the document available to its designated audience.

Figure 22:
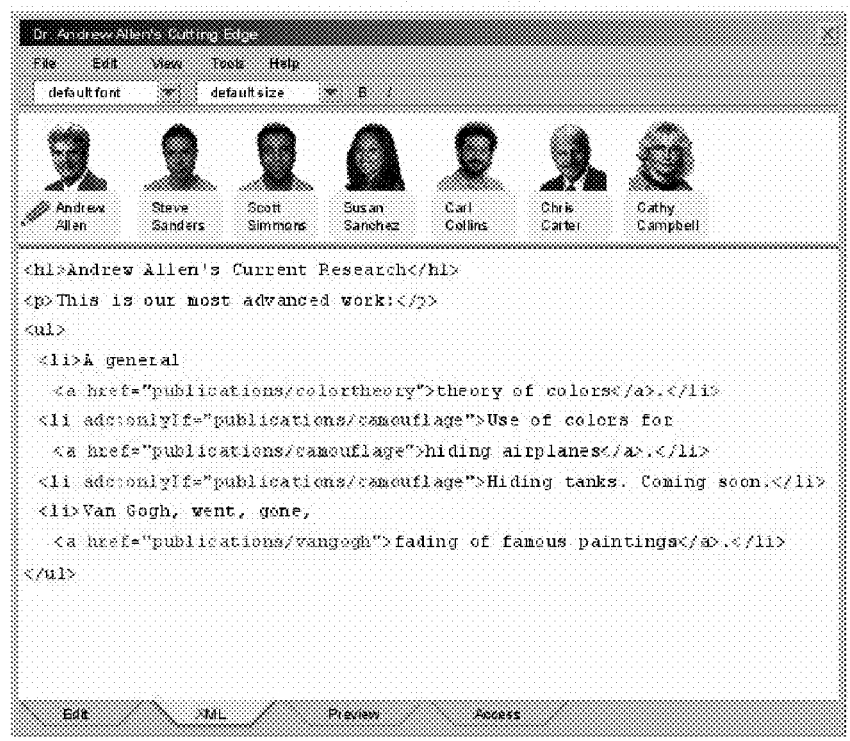
FIG. 22: It is possible to see the document's XML for FIG. 21.

The operator is curious and he selects the XML tab 2133, which takes him to FIG. 22.

FIG. 22: It is possible to see the document's XML for FIG. 21.

Figure 23:
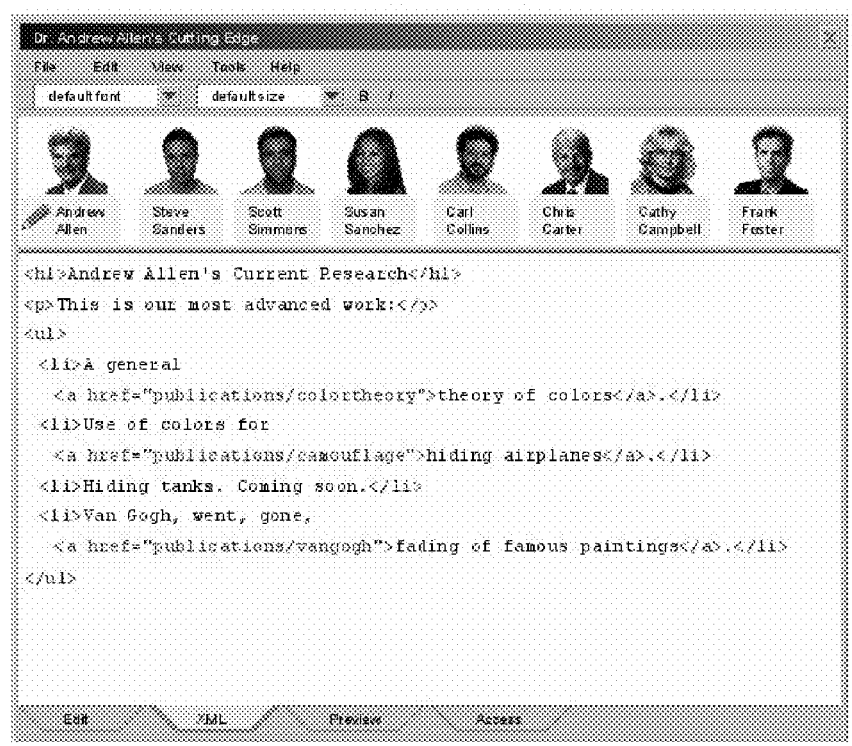
FIG. 23: The document's XML at the time of FIG. 1.

FIG. 23: The document's XML at the time of FIG. 1.
Additional Elements

This disclosure so far has presented a narrative description of many interconnected features of the present invention. Following sections present additional features one at a time, deal with implementation, etc.
Before Inserting a Hyperlink If one has developed code for visually indicating whether there is a difference between access control settings for two documents, or whether they are the same, as e.g. for above described popup hints, then it should be possible to use the same or almost identical code to indicate whether there is a difference before even inserting a hyperlink. It would allow deciding before referencing another document: If that other document isn't accessible to the audience of the current document, then maybe (by organizational policy or by common sense) it shouldn't be referenced.
Following Hyperlinks Documents at the other end of a hyperlink could open in the same or in a separate display area, and when opening they could either display their contents or immediately switch to display their respective access control settings.
Issuing Commands Visualizations of access control settings could often be enhanced by the ability to interact with them to modify them. Interactivity often would require the ability to select an item. While selection often is associated with highlighting, it does not absolutely have to involve highlighting. Modification often involves issuing a command. Context sensitive popup menus, menu bar based menus, but also speech commands, drag and drop, shortcut keys, and hyperlinks (from textual or graphical representations) are known ways of issuing a command. A user could be selected and the Delete key could be pressed. A user could be selected and plain English (or other) language descriptions or symbolic representations (e.g. icons) of possible commands could display and make themselves executable as hyperlinks. Localization to different human languages should allow diverse workforces to share use of the same system.

Expert Systems

An "expert system" has been defined to be a set of rules that can be repeatedly applied to a collection of facts. Rules that apply are "fired", or executed. In the context of the present invention one is most interested in embedding a lean expert system into user interface code, which appears to be in contrast to literature that emphasizes valid but differently flavored use of expert systems for professional knowledge domains. Really, in the context of the present invention one is mostly interested in a "rules engine" (also "rule engine"), and it so happens that a lot of the work in that field has been done under the epithet "expert system".

CLIPS is an expert system tool in the public domain, written in C by numerous contributors over nearly two decades. CLIPS is said to provide a complete environment for the construction of rules based expert systems, and it can be embedded within and called from other code in languages such as C, C++, and Java.

Jess (a registered trademark of Sandia National Laboratories) had been conceived as a Java clone of CLIPS, but since then has grown by a number of distinct features. Using Jess one supposedly can build Java software that has the capacity to "reason" by using knowledge one supplies in the form of declarative rules, with Jess supposedly being small, light, and one of the fastest rules engines available.

In his article "Some Guidelines For Deciding Whether To Use A Rules Engine" George Rudolph presents many decisive questions, then advising that under many circumstances one doesn't need to, might not want to, or shouldn't use a rules based system. One encouragement he provides is: "If you have 3 or more conditions in your rules (or, for example, a block with 3 or more nested if-statements in pseudo-code), then consider using a rules engine." The article ends with an important note: "In cases where you find you may not really know or understand the rules you are trying to encode in your algorithm, a rules engine can provide a flexible way to encode and modify the rules over time as they are discovered." Hence, one can save development time by using a rules engine.

Comparing Access Control Settings

It can improve ability to correctly set access control settings, hopefully enhance productivity, and be quite visually impressive to have side by side the current document and a document it references by hyperlink (or a document the operator considers referencing) and have both of them display their access control settings, as needed either effective, defined, or simultaneously effective and defined.

In such comparative display it could be useful to visually represent differences, including but not only by using color, folding, if meaningful then allowing drag and drop, in ways that correctly deal with the structure of access control settings, trying to automatically as much as possible make sense of access control settings for two different documents, at least in some functionality similar to text-only functionality provided in WinDiff software version 5.1 by Microsoft.

Automatically Recognizing Groups

In many pieces of code, both trying to display access control settings and trying to manipulate access control settings, it will lead to better results if there are code libraries built in, available, and being used that automatically match sets of users to groups. Complete matches are valuable to recognize. Alternative matches can be valuable to recognize. Almost complete matches can be valuable to recognize.

An example use for automatic recognition of a group is when the operator has added a number of individual users that then make up a complete group. Depending on preferences the operator may or may not be informed of the option of defining the group in access control settings (for the current document) instead of its individual users. If such features are provided then as required there should be (electronic) help available to educate operators and other responsible personnel if there are potential consequences of such "magic".

A prime example for translating a simple command issued by the operator into a sequence of access control settings changes is as follows: If the operator in a display of the effective set of read authorized users (for the current document) selects a user and issues a command to delete that user from access control settings (for the current document) then executing code might have to first delete from access control settings the group which effects that user and then instead insert the members of that group except that user, or if easier to implement insert all members of that group and then delete that user. Depending on preferences, the operator may or may not be informed of all details of such transaction and may or may not be asked to approve of some details of such transaction. (This specific example command could be implemented to execute differently in such systems that allow certain kinds of "deny" kind of access control settings.)

A loop not to trip into is: If an operator issued command leads to replacement of a group entered in access control settings by its users entered in access control settings then don't right away ask the operator whether he wants to replace the users by the group. It may be ok to ask once all access control settings editing appears to be finished, if then such circumstance (entries for all users of that group) still exists.

This is an area where using an embedded expert system could help making a better implementation. Some programmers, however, might prefer to use other techniques (i.e. not an expert system) for all these decisions, e.g. to hardcode, but that could lead to source code bloat. Either way it is important to remember that the present invention is about operator productivity while ensuring correctness in access control.

Another example use for automating working with groups is if algorithms (or rules processing) would recognize if a (large) group has read access to the current document, yet most of its users wouldn't be authorized to follow many or all hyperlinks from the current document with the exception of one user (or a few users) who would be authorized to follow all hyperlinks, then suggest to remove that (large) group from access control settings and to add that one user (or few users) only instead. This should not be the only option offered, if offered at all, but if already recognized then it seems important enough to try offering it when and as appropriate.

Visually Indicating Problematic Hyperlinks

For indicating problematic hyperlinks in a document, alternatively to highlighting red (or any other color), other indications could be used, including but not only font modification (e.g. slanting, increasing or decreasing weight, or style of underlining), or region outlining. Insertion of graphics (e.g. icons, but also text) next to hyperlinks could change document layout, but it is possible.

A similar choice of indications should be considered for indicating access dependent contents. Within an implementation nevertheless there should be clear distinction between indications for different categories of document contents.

When more problematic hyperlinks are in a document than are currently in its visible display area then something like overflow indicators could be used, as described in aforementioned patent application Ser. No. 10/802,658, specifically in section "GUI Information Overflow".

At any status, i.e. discontinuous or not, for a hyperlink there are two common visually recognizable representations in the context of editing the document in which it is: (1) the text of the hyperlink if it is a text, or else whatever image, button, etc, and (2) the URI it is linking to. For theoretical consideration, a third element of a hyperlink could be the URI it is linking from, which generally can be assumed to be given by its context being the document.

Using Color

The colors described in this disclosure and used in its examples have been chosen carefully and under consideration of significant amounts of user interface design experience. If, however, other colors are found to produce better results then such other colors should be used and by virtue of their benefits still would be in the spirit of this invention.

Consistent use of color matters both within a design itself, as well as with the surrounding environment (on the computer display as well as in the real world) that people are familiar with. For some operating systems and GUI libraries there is normative documentation available.

It may become beneficial to define "workaround colors" to use when document colors would conflict with highlighting colors or with other user interface colors. To be sure, such conflict couldn't be caused by a grayscale photo id. It could be caused, however, by a document. In practice, black has proven to be a good "workaround color". Considering use of black forces consideration of shape rather than solely relying on color.

Some of the use of color as described in examples in this disclosure is: Red to distinguish problem from normal. Solid red background to distinguish selected problem from other problems in same context, other problems being outlined by a red frame. Black text is normal, blue text is hyperlink. Blue text on white background in red frame is problematic hyperlink. White text on red background is selected problematic hyperlink. Discreet green background for user in preview mode means ok, authorized to follow all hyperlinks. Modest turquoise background in access dependent contents mode indicates access dependent contents.

Presenting Possible Courses of Action

When notifying the operator about a discontinuous hyperlink then there is a logically determined set of possible courses of action that could be presented: Either change access control settings for document being linked from (the current document), or change access control settings for document linked to (the referenced document), or set access dependent contents (in the document being linked from), or allow the hyperlink to remain discontinuous.

In an implementation, however, not all of these options might be presented in an equal manner. For example, in the context of editing the current document it already should be easy enough to change access control settings for the current document at any time, hence it might not be listed again as an option in a context sensitive popup menu for a discontinuous hyperlink. As another example, allowing a hyperlink to remain discontinuous might not require any action at all, so it might not be listed as an option in a context sensitive popup menu for a discontinuous hyperlink either. As another example, it might be determined that the operator is not authorized to change access control settings for the document linked to (the referenced document), then that might not be listed as an option in a context sensitive popup for that specific discontinuous hyperlink either.

It also could be made a preference (per implementation, per installation, or set by an administrator per system or per user) to encourage people to make certain kinds of changes, either to suggest or to enforce that they don't make other kinds of changes, e.g. to direct operators towards not using access dependency if instead they can reach objectives by changing access control settings, or e.g. in another installation just the opposite, i.e. to direct operators towards using access dependency and avoid changing access control settings. Such "directing" can be done e.g. by first showing preferred options, with "first" being in any possible dimension, i.e. in one, two, three, or four dimensions. One-dimensional first e.g. is being first in a menu, two-dimensional e.g. is being in the top left corner of a display area, four-dimensional first e.g. is being first in time. To "enforce" can be done e.g. by blocking undesirable options from execution, or by not making them available for selection.

Recently Used URIs

For the Show Only If submenu additional items could include recently used URIs. A risk associated with that is that unless special safeguards would be implemented, however, the operator could more easily confuse and then apply similarly looking URIs.

All Hyperlinks and Users in One Display

For review purposes one could display a tree table or similar structure which shows all hyperlinks with their effective sets of users next to them. This probably would be more useful with documents with small distribution, or in generally small group settings, if at all.

Differently than described elsewhere in this disclosure, a table or a tree table could be displayed in which rows are for hyperlinks or for hyperlink URIs and columns are for users or for groups (and users). A reviewing operator could see patterns that otherwise would not be easy to recognize. Such display could be for the hyperlinks of one document, or it could be used for a subset of a document's hyperlinks, or it could be used for a larger set of hyperlinks or URIs, possibly but not only from multiple documents, from a directory, from a project, from an archive, or from an organization.

Sorting Hyperlinks

One or several sort orders could be defined for access control settings. E.g. the settings consisting of group "corporate" could sort before the settings consisting of group "corporate" and user Steve Sanders. Then, hyperlinks and URIs could be sorted by such sort order for access control settings that are in effect for them. Hyperlinks also could be sorted (and displayed in groups) by a more commonly known sort order for their URIs, e.g. URIs alphabetically. Hyperlinks also could be sorted by their occurrence in the document.

When to Check for Discontinuous Hyperlinks

There could be different times when it makes sense to check for discontinuous hyperlinks. One time is before saving, then either with a blocking or with a non-blocking notification. Alternatively or additionally, a background task could check for discontinuous hyperlinks when the operator is idle and update a non-blocking display area. Alternatively, checking could be performed each time the operator inserts, changes, or removes a hyperlink.

Checking for discontinuous hyperlinks could be done towards the end of a step in operator interaction, e.g. after editing, before saving. Saving not necessarily must be called "saving", e.g. it also might be disguised as "sending" of a message, "closing" or "returning" a record, "signing" a report etc.

Work in Progress Shouldn't Leak

When working with documents with access control settings which are stored on a server there is the potential for problems with saving work in progress: If (for any good reason) the operator already has set who will be allowed to access a document and then has to save it as work in progress (e.g. to catch public transportation) the result would be that those allowed to access the document would be able to see it as work in progress, which is not a good default behavior, specifically if desired access dependency has not been set yet. Possible alternatives for workarounds include but are not limited to a release flag, or a temporary storage area.

Review and Resolution Steps

A possible outline of steps of helping an author (operator) comprises: For a document for each hyperlink in it do the following: Determine whether there is a difference in access control settings between the document linked from (i.e. the current document) and the document linked to (often called the referenced document). If there is a difference then notify the operator, either for each hyperlink one at a time or summarily for all hyperlinks in the document. If the operator is interested, show which hyperlink and as much detailed information as requested and as possible (as defined and limited by user preferences, system wide settings, and implementation features). Use features such as highlighting (often a colored background or frame), popup hints, inlined information, a list of hyperlinks with surrounding document fragments (e.g. a line containing the hyperlink). Information to display associated with the hyperlink may contain an exact description of the difference, descriptions of either the differences in access control settings as defined or as effective or both, likenesses of people, numerical differences (e.g. "287" meaning 287 users could not follow the hyperlink), or other options. Present to the operator options to either introduce access dependency settings, to change access control settings for the document linked to, or to change access control settings for the document linked from (i.e. the current document). When introducing access dependency settings then present reasonable options to select sections and alternatively allow to freely select sections of the document to be covered by access dependency settings.

Some of these steps could be omitted (e.g. by default) or made so minimal that they are not recognizable (e.g. integrated into something else).

One example of a variation of these steps is not to present reasonable options to select sections of the document to be covered by access dependency settings, but only to let the operator freely select.

One example of a step that might barely be recognizable as fitting above description is if to change access control settings for the document linked from (i.e. the current document) in the user interface is so readily available to the operator already that it wouldn't have to be presented as an option any more than it already is an option at any time when working with (at least when authoring) the document.

An example of a step that could be omitted is asking the operator whether he is interested. Instead it could be made mandatory to review discontinuous hyperlinks, either by implementation, by system wide setting, or by user preference.

In an implementation if one keeps tracks of differences then one doesn't have to parse everything all the time. That could be considered a form of caching.

Many Users

Above mentioned display of numerical differences, e.g. "287" meaning 287 users could not follow a hyperlink, is one of many ways one can make meaningful use of the present invention in such cases when the number of users is so large that an operator couldn't (find time to) consider each user individually.

How Many Different Results

It may be desirable to inform the author of how many different results of processing access dependent contents of the current document could there be. An integer number or a symbolic representation could fit into a (small) designated display area.

Regrettably, using the simpler expression "versions" instead of "different results of processing access dependent contents" for many practitioners of the art might cause the thought of versions as effect of editing as time passes, which is not the topic of this section.

All users who would see the same could be considered to be in one logical set. Different sets could be named. One possible naming scheme is integer numbering. If a simple cause can be determined algorithmically then naming by cause should be possible too, e.g. by group membership. Membership in a named set could be used for tagging in preview mode. E.g. in FIGS. 18, 19, 21 there could be additional small numbers written next to or within the representations of users, specifically 1 for Andrew Allen, 2 for Steve Sanders, 2 for Scott Simmons, 2 for Susan Sanchez, 1 for Carl Collins, 1 for Chris Carter, and 1 for Cathy Campbell. Sorting users by logical set membership for a document then could be an additional option.

Alternatively, in preview mode different results of processing could be put into a (further nested) separate tab each.

Changes that No One would Notice

When access control settings change in time then additional checking for discontinuous hyperlinks may be desirable. Such checking could occur right when making changes. If so then it could be coded to block making changes if a conflict occurs, or to roll them back. It could be coded to notify if a conflict occurs. It could be coded to log if a conflict occurs. Such checking could occur at later time, when such task better fits the availability of processing resources. Such checking could or should be part of an auditing process.

One possible scenario of an interesting change of access control settings is if access control settings are being changed for a document which is referred by (linked to from) other documents. If reverse links have not been kept track of (cached) then a search (for links from other documents) would have to be done if wanting to know such instances.

Another possible scenario of access control settings change is if users are added to or removed from membership in a group. If one document has access control settings defined that contain a reference to the group, hence membership is being determined dynamically, yet another document has access control settings that have been defined by adding all members of that group individually (a reasonable practice, e.g. by macro) at some past point in time, then after a change of the set of users defined to be members in the group it then can happen that a previously continuous hyperlink then for some users effects discontinuity. Specifically so e.g. if the referring document has settings defined with a reference to the group, i.e. dynamically, if the referred document had settings defined with members individually, e.g. by macro, and if then new users are being or have been added to the group. Specifically so, but opposite, e.g. if the referring document has members individually, the referred document has a reference to the group dynamically, and if then users are being or have been removed from the group.

Acceptable Imperfection

There seem to be opposing ideals: Security versus getting things done. Either in implementation, or in CPU cycles, or elsewhere there is cost involved in ensuring that there won't be discontinuous hyperlinks. Disregarding cost, some may want to proclaim a system to be defective, useless, or a failure if it doesn't absolutely prevent discontinuous hyperlinks. That argument can be weakened by pointing out somewhat analogous mechanisms which are deemed acceptable: Contemporary word processing software products have features that automatically convert (single or double) quotes into curly (single or double) quotes. While those features appear to be working correctly in more and more situations it still is possible to insert straight (single or double) quotes, e.g. when pasting text from elsewhere. Those automatic curly quotes features nevertheless are considered valuable, even if there are cases they don't catch.

If one wants conforming documents guaranteed all the time, that requires extra effort, extra expense, such as implementation of triggers, use of event mechanisms, and protections against modification (which is a move towards "getting nothing done").

The Author or Someone Similar

The author is an operator. A term could be defined that describes an operator who is allowed to change access control settings and access dependency settings. The author commonly is allowed to change access dependency settings and access control settings. Other operators may be given permission to do so too. This disclosure often only writes about "the author" yet actually means the author or someone with same or similar permissions, because a short term hasn't been defined yet.

Carefully Wording a Notification

For the notification in FIGS. 2, 12 it may be worth considering different wording. "There are access-control-discontinuous hyperlinks in this document. Do you want to review them?" is correct, but might be too technical for many people. Other options are "Some users cannot follow some of the hyperlinks they see in this document. Do you want to review?" or "Apparently, some users cannot follow some of the hyperlinks they see in this document. Do you want to review?" Use of the word "apparently" expresses the possibility that it might not be exactly so, which probably is more appropriate than an absolute claim of factuality specifically in a sufficient large system where not everything might be possible to determine accurately quickly and where others can change settings too. More options are "Apparently, some users will not be able to follow some of the hyperlinks they can see in this document. Do you want to review?" or "Not all users can follow all hyperlinks they see in this document. Do you want to review?" or "There are access-control-discontinuous hyperlinks in this document. Do you want to try correcting this?" Each one has a slightly different meaning.

Instead of or in addition to a carefully worded notification display, the system could emit a more or less descriptive sound.

Review and Resolution Loop

A most coarsely grained outline of steps of helping an author (operator) comprises: (1) determine situation, (2) if no problem then done, (3) alert to it, (4) if not interested then done, (5) review it, (6) if not interested then done, (7) try correcting it, (8) back to start over at (1).

Weighing Too Many Choices

Expert system (rules based system) technology could be used to assist in analyzing discontinuous hyperlinks, for recognizing special cases, for putting commands into context sensitive popup menus. One of the techniques involved would be to associate numeric weights with different cases. Sorting by weight then could be used to determine order in which options are being suggested, or how many to present before cutting off a list of options or before using progressive disclosure. Weights could be used with coding techniques other than expert system technology as well.

Sets of Users Worth Indicating

In several modes (of those implemented in a system according to the present invention) it should be possible and could be desirable to indicate one or all of the following sets of users (for a document): Those who cannot follow any hyperlink at all. Those who cannot follow any of the discontinuous hyperlinks, i.e. those for whom each and every discontinuous hyperlink would effect discontinuity. Those who have the most "problems". Such indication should be easier to implement when all users with access are being displayed already, and a set only must be highlighted to indicate it.

Not Only Exact Lists

It may be important to consider that when there is a list of users it can be valuable to display various forms of lists that comprise users who would experience discontinuity, rather than a list that exactly lists all and only those users who would experience discontinuity. It need not be "all" who would experience discontinuity, because even listing some may be valuable information already. It need not be limited to "only those" who would experience discontinuity, because also listing some who wouldn't experience discontinuity can be a meaningful user interface, specifically if sorted or visually marked appropriately, e.g. dimmed.

Sorting can be by criteria that are not displayed, as long as they are related to the items being sorted. E.g. one can sort users in descending order by number of discontinuity effecting hyperlinks and then show users in that order without displaying that number.

Equivalent logic should be applied to lists of hyperlinks and to lists of URIs.

Sorting Lists

Lists of hyperlinks could be sorted in various orders including: By occurrence in document; by number of users for whom the hyperlink would effect discontinuity; by destination URI, where one destination URI could occur in more than one hyperlink in a document; and by set of users for whom the hyperlink would effect discontinuity.

Lists of users could be sorted in various orders including: By number of hyperlinks which would effect discontinuity for the user; by number of destination URIs which would effect discontinuity for the user, which could be different as one destination URI could occur in more than one hyperlink in a document; by number of hyperlinks (or URIs) which would effect continuity for the user; by number of access dependency screened hyperlinks (or URIs) for the user; by number of hyperlinks which aren't access dependency screened for the user; by groups; alphabetically; by position in an organization; and by physical location.

Lists can be displayed using techniques of sorting, and folding (progressive disclosure), in order to show biggest problems first.

Working with Many Resources

When working with many documents or other resources there can be empowerment if one can rapidly browse, sort, and visualize. A small business owner or a sales representative can benefit from finding previous years' repeat customers with a specific area code or in a ZIP code range. While command line based queries work well for some people, many others can work much better with a GUI.

Similarly, some people and organizations would benefit from browsing access control information. Admittedly, there is potential power in scripts that analyze batches of access control settings and access logs. But given the possibility, one shouldn't forgo implementing visual browsing of access control settings and access logs.

Traditional file trees, file lists, or file sets in tree tables, with as many of their prior art features as reasonable (name, file size, file type, modification date, thumbnail, summary, owner, author, folding, sorting, links, etc), could be enhanced by displaying access control settings. E.g. additional optional columns could show access control settings as defined and as effective. Powerful new features should include sorting by access control settings, filtering by access control settings, possibly editing of access control settings.

Visual markings could be possible for resources the access control settings for which are equal to, a superset of, or a subset of access control settings for a designated resource.

One interesting query could be to request to see a list (or tree or other summary form) of all resources a specific user has access to. Then a further query could be to request to see a list of all resources a specific user has accessed. Such lists could be presented by themselves, i.e. filtered out, or visually marked inside the original list, possibly sorted.

A visual display could e.g. help recognize a pattern like this: A doctor passes on about a tenth of his cases for second opinions. Four out of six weeks he passes on to one colleague, and the other two weeks he passes on to another colleague. There need not be anything alarming about that pattern in this case. It could simply be that their work shifts coincide and diverge in that rhythm. The display required to find that pattern would have to list medical records of that doctor together with access control settings or access log settings, ideally sortable by date, by access control settings, and by access control log.

Quick Modifications

An interesting but potentially somewhat dangerous option is to have in context sensitive popup menus (e.g. in the context sensitive popup menu in the display of who effectively is allowed to access the current document) a command to copy ("pick up") a reference to a user, and then later if that user shows up in a problem description to have commands to add (paste) him (a reference to him) to access control settings for a linked to document ("drop him off").

Somewhat finer control would be not to pick up (copy a reference to) the user himself, but to allow picking up (copying a reference to) a group the user is a member off.

Taken further, albeit opening the door to unintended changes of access control settings, one could implement dragging of a user's representation from the display of who effectively is allowed to access the current document directly into a hyperlink (specifically if it has a problem description) in order to "fix it". Ease of use might be the very reason not to make such a feature available.

Alternative Navigation

One possible useful interactive display would allow in editing mode selecting (clicking on) a user and then seeing the (remaining) hyperlinks which would effect discontinuity for him highlighted (in the same color as he is highlighted) and jumpable (by shortcut key).

Timing and Concurrency

When implementing a GUI for access control settings there can be interesting issues of timing and concurrency. What one wants to avoid, but not necessarily if doing so becomes too expensive, is that a GUI already shows that a user or a group has been removed from being authorized to access, but access control settings haven't been updated to reflect that yet. If the operator walks away right that moment, how long then would the document be accessible to that user or to that group while the operator thinks he has removed them already? Until the operator's next work shift, the next day, after the weekend, several days later?

In order to keep implementation feasible there is a fallback position: One can always invoke code that fetches actual access control settings and refreshes the display.

Before using such fallback position, however, there are a few other techniques: Access reducing modifications should be stored to access control settings before updating the display. Newly created or currently edited documents should be blocked from anyone accessing them until all editing including access control settings is done. In systems that allow certain kinds of "deny" kind of access control settings (not all access control systems have that kind of functionality) there it could be beneficial to wait with storing (or with committing) access expanding modifications until there is greater certainty that no directly related "deny" kind of access reducing modification follows.

One potential problem with blocking all access to newly created or currently edited documents is the situation of someone, or remote team members, editing two (new) documents at the same time (in separate windows, in separate processes, or on separate machines) and having them link to each other by reference (which is possible and plausible). With all access blocked then neither could perform checking for discontinuous hyperlinks. Inspiration for solving that problem, if it ever occurs, can be found in deadlock resolution for databases. If infrequent then one possible workaround is to throw an exception and to catch it into code that produces an error message. If frequent then the same exception could be caught into code that causes a retry.

Possible options for keeping implementation cost within limits include: Tolerate inconsistencies if infrequent and not a real risk; and verify after the fact what cannot be kept under control in real time.

Composing Group Likenesses

When working with access control settings with each document, on a regular basis, the following functionality regarding representation of users and groups should be beneficial:

The editor for defining groups should based on individual icons (with photographic likenesses) allow to create composite icons of two people, a finite number of specific people, or some specific people with indication (outlines) of more people. Composition should be offered to be done automatically, with options to manually adjust and override. Icon width might be variable (adjustable) in order to accommodate group size.

The editors for defining groups and users should provide contemporary graphics functions that allow insertion of photos, logos, and other images, and their arrangement using features including but not only transparency, and text annotation, ideally also supporting vector graphics.

One example use would be if a large organizational unit of about fifty people is made up of ten smaller organizational units, each with their respective leader. The composite icon for each smaller unit upon group definition (and again when relevant data changes, e.g. unit's leader, or leader's likeness) automatically (by default) could be offered to comprise a photographic likeness of the unit's leader with dim (possibly smaller, possibly abstracted) likenesses for the unit's other people in the background. If a unit has a symbol associated, a unit's symbol could be placed in a corner of the unit's icon.

One possible method for creating composite icons of people is: to put individual images into layers; to relatively position the layers as if people would be standing in a common arrangement for group picture taking; and then to merge the layers. Alternatively, one could formulate a method so that relative positions are determined before any image gets put "into a layer": to put individual images into layers in relative positions as if people would be standing in a common arrangement for group (portrait) picture taking; and then to merge the layers. Alternatively, but maybe not optimally, a method could merge layers each time another individual image gets processed.

For good results in creating composite icons of people, masking of photographic likenesses should be performed. Masking the photographic likenesses of each user with the outline of a bust as an integral part of using photographic likenesses has been suggested in aforementioned patent application Ser. No. 10/802,658, specifically in section "GUI Photo Ids". Individual (per user likeness, one-time) adjustment of the shape of the mask is being suggested below in section "Fixing Photos". One skilled in the art will agree that one possible way to effectively store individual masking information is in the alpha channel of the icon, which should be compatible with many contemporary graphics software libraries. If using vector graphics, however, then the shape of a mask probably (unless e.g. there is some implementation, compatibility, or performance reason not to) should or at least could be stored as an additional part of the icon's vector graphic.

Differentiating Users

When displaying large numbers of users in limited display space, sooner or later one will reduce the amount of information displayed per each user. Theoretically then one projects all of the information about the user onto the display in such way that less information is displayed. At the very extreme users would be represented by so little information (e.g. one pixel) that they would be hard or impossible to distinguish.

It is possible to run algorithms that emulate such projection and in the set of all users determine whether there are pairs of users that would be hard or impossible indistinguishable. Either corrective action could be taken, automatically or operator assisted, or such pairs could be marked for special handling if later one or both of them would appear in a display with potential for confusion.

As an example, one should consider two people of the same last name, working for two different organizations. Charles Cooper, CDC, and Craig Cooper, CDF. If a view were defined to save space by displaying initial of first name and last name, then they both would be C. Cooper. Corrective action would be to exempt from saving space and making them either C. Cooper, CDC and C. Cooper, CDF, or Cooper, CDC and Cooper, CDF, or Charles Cooper and Craig Cooper.

Comparison for differentiation could be run at intervals, or could be triggered when adding a new user. Display information could be cached in similar data structures as underlying basic information about the user, in order to avoid excessive recalculation efforts at a central server.

In systems where operators rely on visual representations, specifically on photographic likenesses, it may be a high priority to compare photographic likenesses in order to find instances of lack of sufficient differentiation. This may not only but specifically be important where cultural barriers, language barriers, or literacy barriers are real. A literate operator in one language may be illiterate in another writing system, even if he is able more or less to verbally communicate. If documents contain references to tangible resources, if electronic access control settings control access to facilities or to goods, then e.g. it could occur that access control settings for a facility or for sensitive goods are controlled by operators for users whose names they cannot read or whose names they effectively cannot remember.

One possible corrective action to take when users are found to be too difficult to distinguish by photographic likeness is then for those users to insist on display and verification of additional information, e.g. a unique numerical or a mnemonic personal id.

Comparison of photographic likenesses is being practiced in the art in order to identify people. One technique to do so is by use of neural networks. The present invention, however, suggests using comparison to ensure operators' ability to distinguish within a set.

Algorithms for finding similar (or close) pairs in sets are known in the art. A number of different methods for quantifying similarity of faces are known in the field of face recognition. Most or all combinations of such algorithms with such methods should produce results. Respective weaknesses and strengths of an algorithm used and a method used can be expected to reflect in their combined weaknesses and strengths. Choosing an algorithm and a method and combining them is within the skill of those in the art. A method that for each face determines a coordinate point in a multidimensional space (of features) should be especially well fit for use with known algorithms for finding similar (or close distance) pairs in a set.

Fixing Photos

Working with photographic likenesses of users for access control as described in this disclosure, the following functionality should be beneficial:

The editor for defining users should have a system that calculates a score and gives feedback how close an image is to ideal (standard or average) form for a photo id. Then it should allow manual editing. It should give advice. It should let the operator (an administrator or the user himself) do manual editing. Then it should calculate a score again. If good enough then it should let the image be submitted, else continue directing the user towards ideal form.

The operator should be able to determine outside shape of head, hair, neck and shoulders (for masking the image) with freehand drawing tools. Dynamically calculated or preset templates (for masking the image) may be suggested by the editor. Other parameters may include horizontal and vertical shifting, sizing, as well as contrast and brightness for all or part of the image.

Microsoft Research Cambridge UK has made publicly available information about technology under the short name "GrabCut" and under longer names "Interactive Foreground Extraction using Iterated Graph Cuts" and "Interactive Image Segmentation using an adaptive GMMRF model". One could summarize: "GrabCut algorithms make it possible for an image with a single (mouse pointer aided) operator command to remove the background behind an object, doing so with outstanding quality results for minimal operator effort."

The present invention suggests integrating GrabCut or similar or better technologies into an editor for defining users in an access control system to help determining visually appealing and requirements conforming outlines of people's photographic likenesses in a time efficient manner. It should be made available as an additional optional step in the editor's GUI.

Alternatively, given that by now (due to experience and to personnel training) most photo ID pictures already are being taken close to required characteristics (format, position, lighting, etc.), GrabCut or similar or better algorithms could be triggered to execute automatically, in doing so giving an algorithm initial parameters as if an operator had made a simple mouse pointer aided selection fitting a photo ID picture.

With modern graphics platforms it is possible to define image masks that have a feathered edge, or that have a gradient at the edge. Operator determined or automatically determined masks can be stored (in such definitions) and from then on can be used (across machines) without further need for the process that has created them.

A less than ideal image could be stored at any time, e.g. if subject user is only present at a certain time for picture taking but an administrator capable of editing images is only present at another time. A flag could be set which is interpreted to either recommend or require improvement before allowing further use of such image. Permanent storage of both an original and a standard compliant image may give best results for both determining user identity as well as consistency of user interface.

Drag and Drop to Remove

Prior art graphical user interfaces exist in which "dragging and dropping" is a feature which allows to move or to copy files (Microsoft Windows XP Windows Explorer, Apple Mac OS 9 Finder), to move text (Microsoft Word 2000 drag and drop selected text to other position in text), or to insert graphics (Microsoft Visio 2000 drag and drop master from stencil to drawing).

One interesting feature is the "Recycle Bin" of Microsoft Windows XP or "Trash" of Apple Computer Mac OS 9. There in most cases if a file is thrown into the garbage can then the file will be deleted (although a CD-ROM might be ejected instead).

It should be noted that the discussion in this section is not to be confused with issues related to functionality which has become available in GUI libraries which makes it possible to drag and drop between software which has been developed independently; there a major focus being the encoding of data to be transferred.

Now, if in a graphical user interface it is possible to edit access control settings by dragging and dropping indicia for users, groups, macros, or other entities then there are slight asymmetries between adding and removing. Examples for "adding" are illustrated in aforementioned patent application Ser. No. 10/802,658, specifically in its FIGS. 10 and 19, also described in its section "Graphical User Interface". For "removing", however, there isn't as easily applicable widely used precedent as for adding.

Dragging the likeness of a user into a garbage can would have at least two issues attached to it: Emotionally, to some people it might be offensive. Semantically, what is meant to be achieved is to remove the user from the set of people who are allowed to access a resource, which is different than the semantics when deleting a file, where the file is meant to cease to exist. The same symbols should not be used to (a) end existence vs. (b) merely to discontinue access authorization (a relationship of sorts).

Two common prior art methods for removing an element from a set are by context sensitive popup menu (with a Delete item or with a Cut item) and by shortcut key (the Delete key). One example could be Adobe Photoshop Album 2.0 for deleting a photo from the catalog. Another example could be Microsoft Windows XP Windows Explorer for deleting files. An example with slightly different semantics could be Microsoft Excel 2000 for deleting (the contents of) a cell. These methods, however, don't involve dragging and dropping.

In the context of access control it is desirable to consistently allow adding and removing of users to the set of people who are allowed to access a resource, consistently by dragging and dropping as well as consistently by other methods, if for no other reason then at least in order to consistently allow quick correction of a mistake. If a pointer gesture (mouse movement) can add user James then a pointer gesture (mouse movement) should be able to remove user James (e.g. before replacing him with user John).

One can imagine that someone could suggest using an eraser. Someone could suggest dropping an eraser on an indicium for a user. Someone could suggest dragging an indicium for a user to an eraser. Someone could suggest recognizing erasing pointer gestures (mouse movements). Some of those suggestions could entail more problems than others. Applying office equipment to the likeness of a user increases the risk of emotional disturbance. A widely used icon for the Cut command are scissors; would an operator associate hair styling scissors or office scissors?

The present invention suggests providing an "exit" region and dragging indicia of users (and groups) and dropping them onto the "exit" in order to remove them from the set of people who are allowed to access a resource.

Possible renderings for an "exit" region include but are not limited to: A door open to the outside; an "Exit" sign; or the same display region from which indicia of users can be "dragged in" to add them.

Visual and aural effects could accompany and confirm removal, including but not only: The sound of a door closing behind a person leaving; or a swoosh. The most obvious confirmation nevertheless should be consequential absence of any and all removed users from (the visual representation of) the set of people who are allowed to access a resource.

Before effecting changes, after dragging and dropping has been recognized, additional interactive confirmation of operator intention should be possible to implement (e.g. by a dialog box, something like "Do you want to remove this user from access to this resource? Remove? Keep?"), but in an environment with (almost) immediate visual feedback for operator action such additional interactive confirmation may be more of an obstacle to operator efficiency rather than being helpful. Special (domain specific) situations, of course, could warrant additional interactive confirmation, as much for adding users to as for removing users from the set of people who are allowed to access a resource. Multiple alternative levels (of additional interactive confirmation or lack thereof) could be implemented in one system and could be activated as indicated by preference settings or as dictated by rules.

Hints Don't Interact

In contemporary user interfaces many or most popup hints don't allow clicking in them. While hints are meant to be informative, when it comes to issue commands many contemporary user interfaces prefer clicking on the main level user interface object itself or use of a context sensitive popup menu. An implementation of the present invention can go along with such prevailing practice and be like that too, even if the implementation contains libraries that equally could be used in different ways.

A different angle of the same theme: If a visualization is displayed in a popup hint, as described in this disclosure, then probably it would be less intuitive or against platform user interface guidelines to allow interactivity. If the same visualization is displayed in a commonly recognized interactive area, inside a window, inside a tabbed panel, etc, then it should be more intuitive to allow interactivity.

Information Next to a Hyperlink

Often sensitive information is next to a hyperlink. Then, making a sentence or a paragraph dependent on whether the user has access to a hyperlink within it often can be an ideally fit safeguard. E.g. assuming the word "picture" is a hyperlink in "Here are_pictures of the launch site." If a user is not authorized to see those pictures then that user probably shouldn't see any of the sentence, and vice versa.

XML vs. GUI

Access control settings can and should be represented both in XML and in a GUI. One lends itself better for automatic processing (in regular use and in auditing), the other for visual verification by human operators.

APIs

In the inventor's preferred embodiment there is a network capable API by which (editor and) GUI code can retrieve and modify access control settings which are stored on a secure server (with the documents). The API ideally uses XML to describe settings and to describe commands to retrieve and to modify settings. Being compliant with standards regarding Web services, at least "being a correctly implemented Web service", should be beneficial in the long run. Access control settings data should be well protected at all stages of transfer to and from the server.

Roles

One can expect implementations where a user or a group is replaced by another concept, e.g. something like a role. The theory and principles of the present invention still would be applicable.

One might see implementations where in addition to users also machines will have individual access rights. The theory and principles of the present invention still should be applicable.

A reasonable approach to visually representing a role appears to be including a visual representation of who is holding the role.

Other than Photos

Photographic likenesses might be replaced by drawings, or by other kinds of artifacts. The theory and principles of the present invention still would be applicable.

Connecting Cultures

Good implementations of the present invention should function well for communication among people whose native languages are different. Many of its features are language neutral, and GUI implementations should lend themselves well for different localizations nevertheless seamlessly accessing the same resources.

Who has Rights to Set Rights

This disclosure is not specific about who has rights to set rights. For easier understanding when reading this disclosure one may want to assume the operator is a super user. Another possible assumption is that the operator has the right to set rights on resources which the operator self owns, on documents which the operator self has authored. In implementation, various algorithms may be used.

Preference Settings

Many preferences optionally could be set at different times, including but not only: (1) once at software design time, (2) at compilation time, (3) at installation time, (4) by an administrator only, hence uniform for all operators, which won't allow operators to create havoc with preference settings, won't require operators to know how to change preference settings, but won't allow them to adapt to their own way of working either, (5) by each operator in specific dialog boxes, tabbed panels, or property sheets, or (6) by each operator at any time, e.g. by popup menus, or by widgets in the user interface, which may be more or less space consuming, optional, etc.

More Combinations

More combinations could be formed by using elements described in this disclosure. One example could be preview mode of a document showing discontinuous hyperlinks.

What it does

In casual language one could describe a scenario: "There is a document being authored that contains links to several other documents. Those other documents are restricted as to who is allowed to read them. The present invention has been developed and should be used to help the author to produce a document that appropriately keeps information restricted."

The present invention helps increase harmony among documents with different access control settings by easing adjustment of access control settings and by easing adjustment of access dependency settings.

A predominant purpose of the present invention is to facilitate highest operator efficiency and to facilitate highest rates of correct decisions in manipulating settings for access dependency of contents and in comprehending and manipulating access control settings. In many practical uses, comprehension of access control settings may or should contribute to the choices operators are making for access dependency settings.

The present invention concerns itself with pointing out where users could have problems following hyperlinks and then enabling the operator to easily and with great certainty get to places in the user interface where he can change settings.

What it Innovates

Differentiating features of the present invention are that it concerns itself with how the author of a document perceives whether or how other users would experience discontinuity instead of continuity, and how he efficiently can work with that information.

Formal Descriptions

This section tries to formally describe items that already have been disclosed above. If one has read and understood everything so far, there probably isn't anything substantially new to be found in this section. What is disclosed is:

A method (M1) for enabling continuity of access control in a body of digital documents in common formats including and not limited to XML, comprising the steps of: (a) allowing the operator to edit a document; (b) beginning to determine any access-control-discontinuous hyperlinks resulting from editing; (c) automatically determining any access-control-discontinuous hyperlinks resulting from editing; (d) if any discontinuous hyperlinks then notifying the operator; and (e) if any discontinuous hyperlinks then allowing the operator to make changes that reduce discontinuity of access control. A method like M1, wherein step (b) is triggered automatically. A method like M1, wherein documents are delivered as XML. A method like M1, wherein documents are delivered by HTTP.

A method (M2) like M1, wherein step (e) includes allowing the operator to add access dependency settings and allowing the operator to make changes to access dependency settings.

A method (M3) like M2, wherein documents are delivered as XML. A method like M3, wherein step (b) is triggered automatically. A method like M3, wherein documents are delivered by HTTP.

A graphical user interface (U1) for enabling continuity of access control in a body of digital documents in common formats including and not limited to XML, comprising a display region for document contents, wherein a discontinuous hyperlink is graphically represented by a visual element which comprises a commonly visually recognizable representation of a hyperlink distinctly modified by at least one step selected from a set comprising: highlighting; font modification; region outlining; and insertion of a graphic.

A graphical user interface (U2) for enabling continuity of access control in a body of digital documents in common formats including and not limited to XML, comprising: a display region for document contents; and a display region which is visually associated with a hyperlink in the display region for document contents and shows an explanation of the access control discontinuity situation of the hyperlink. A graphical user interface like U2, wherein the display region for document contents allows editing.

A graphical user interface (U3) for enabling continuity of access control in a body of digital documents in common formats including and not limited to XML, comprising: a display region for document contents; and a display region which is interactively associated with an operator designated hyperlink in the display region for document contents and shows an explanation of the access control discontinuity situation of the hyperlink. A graphical user interface like U3, wherein the display region for document contents allows editing.

A graphical user interface (U4) for editing a document and access control settings, wherein at least one display region contains a graphical representation of a set comprising one or more users, and wherein a user is graphically represented by a visual element which comprises: the identity of the user; and one or more of the following visual elements: indication of the quantity of hyperlinks which would effect discontinuity for the user; and a commonly visually recognizable representation of at least one hyperlink which would effect discontinuity for the user, if possible then with context. A graphical user interface like U4, wherein the set is represented as sorted by the number of hyperlinks which would effect discontinuity for the user.

A graphical user interface (U5) for editing a document and access control settings, wherein at least one display region contains a graphical representation of a set comprising one or more hyperlinks, and wherein a hyperlink is graphically represented by a visual element which comprises: a commonly visually recognizable representation of the hyperlink, if possible then with context; and one or more of the following visual elements: indication of the quantity of users for whom the hyperlink would effect discontinuity; who effectively is not allowed to access the referenced document; and if possible to determine and to explain concisely then which one or more entities in access control settings cause the hyperlink to be discontinuous. A graphical user interface like U5, wherein the set is represented as sorted by the number of users for whom the hyperlink would effect discontinuity.

A graphical user interface (U6) for editing a document and access control settings, comprising in essentially the same display space each, with only one of them significantly visible at one time: a display region for editing document contents; and a display region for editing access control settings, wherein a user is graphically represented by a display element comprising, at least in part, a likeness of the user. A graphical user interface like U6, wherein the display region for editing document contents and the display region for editing access control settings can be switched to by selecting their corresponding tabs. A graphical user interface like U6, wherein access control settings can be modified by dragging and dropping indicia for users.

A graphical user interface (U7) for editing access dependency settings of a document, comprising a display region for the document which greatly resembles a familiar display region for editing document contents, wherein a plurality of functions are implemented which insert, change, and remove access dependency settings for elements of the document; a context dependent subset of the functions is available for selection by the operator for use; and access dependent contents is graphically represented by visual elements which comprise commonly visually recognizable representation of contents distinctly modified by at least one step selected from a set comprising: highlighting; font modification; region outlining; and insertion of a graphic. A graphical user interface like U7, wherein the display region for the document also is a display region for editing document contents.

A graphical user interface (U8) like U7, wherein one of the functions inserts access dependency settings to effect for the currently selected elements of the document to be shown only if the accessing user is authorized to follow hyperlinks contained in the currently selected elements. A graphical user interface like U8, wherein the one function is available for selection by the operator for use if and only if any hyperlinks are contained in the currently selected elements of the document.

A graphical user interface (U9) for previewing what another user would see when accessing a document, comprising: a display region for previewing what that other user would see if access dependent contents had been processed for that other user; and a display region for indicating that other user. A graphical user interface like U9, in a system where documents are stored as XML.

A graphical user interface (U10) like U9, in a system where documents are delivered as XML. A graphical user interface like U10, in a system where documents are delivered by HTTP.

A graphical user interface (U11) for previewing what different users would see when accessing a document, comprising: a display region for previewing what a specific user would see if access dependent contents had been processed for that specific user; and a display region for conveying users who would see the same. A graphical user interface like U11, in a system where documents are stored as XML. A graphical user interface like U11, further in a display region conveying users who would not see the same, wherein the operator can designate a user who would not see the same to switch previewing to be for such newly designated user. A graphical user interface like U11, further conveying the quantity of different results of processing that different users could see.

A graphical user interface (U12) like U11, in a system where documents are delivered as XML. A graphical user interface like U12, in a system where documents are delivered by HTTP.

A method (M4) for creating an icon for a group of users in an access control system, comprising the steps of: (a) designating a user in the group; and (b) automatically composing a likeness of the user with indication of more people. A method like M4, wherein the likeness comprises, at least in part, a digital photograph of the user.

A method (M5) for displaying a set of users in a user interface for access control, comprising the steps of: (a)

comparing respective intended representations of pairs of users; (b) identifying insufficiently distinguishable subsets of representations; (c) adjusting the intended representation of at least one user; and (d) displaying users. A method like M5, wherein the step of adjusting comprises adding more information about the user. A method like M5, wherein representations comprise, at least in part, a photographic likeness of the user.

A user interface (U13) for adjusting photographic likenesses of users for use in representation in user interface displays of access control settings comprising indication how close calculated properties of such image are to a desired goal. A user interface like U13, for access control settings for digital documents.

A method (M6) for discriminating acceptable from unacceptable photographic likenesses of users for use in representation in user interface displays of access control settings, comprising the steps of: (a) calculating an image property; and (b) testing whether said image property is in an acceptable range. A method like M6, comprising the additional step: if for an image a property is out of range then notify a human operator. A method like M6, comprising the additional step: if for an image a property is out of range then make a note for later corrective action.

Alternatively, a method (M7) for automatically discriminating acceptable from unacceptable photographic likenesses of users for use in representation in user interface displays of access control settings, comprising the steps of: (a) calculating an image property; (b) testing whether said image property is in an acceptable range; and (c) if for an image a property is out of range then performing at least one step selected from a set comprising: notifying a human operator; and making a note for later corrective action.

A method (M8) for adjusting photographic likenesses of users for use in representation in user interface displays of access control settings, comprising a step that makes substantial use of at least one algorithm that allows products like GrabCut and better than GrabCut to give acceptable results for background removal with little or no operator involvement. A method like M8, comprising completely automatic triggering of said step and completely automatic execution of said step with no operator involvement. A method like M8, comprising a step of an operator aiding the algorithm with a pointing gesture.

Dictionary Definitions

These selected dictionary definitions are listed here specifically to clarify language use in claims.

"Enabling" means "making feasible or possible". "Reduce" means "to bring down, as in extent, amount, or degree". "Situation" means "status with regard to conditions and circumstances", "the combination of circumstances at a given moment" or "a critical, problematic, or striking set of circumstances". "Various" means "different". "Conveying" means "making known". "A graphic" means "a graphic display generated by a computer". "Essentially" means "constituting the essence of something". "Significant" means "fairly large in amount or quantity". "Corresponding" means "accompanying another". "Likeness" means "an imitative appearance".

REFERENCES

W3C XML Linking Language (XLink) Version 1.0, W3C Recommendation
RFC 2396, section 1.2. URI, URL, and URN
HTML 4.0 specification, chapter 12 Links
Sun Developer Network article
Creating TreeTables in Swing by Philip Milne, a Sun Developer Network article
Web Services Activity, at the World Wide Web Consortium website
Concurrent Programming in Java by Doug Lea
How to Use Tabbed Panes, in Using Swing Components, in The Java Tutorials, at the Sun website
Document Object Model (DOM) Level 2 Specification, W3C Working Draft
Extensible Markup Language (XML) 1.0 (Second Edition), W3C Recommendation
The JDOM API, an XML API for Java, at the JDOM website
Programmer's Guide to the Java 2D API, Java 2 SDK, Standard Edition, 1.2, Sun Microsystems, Inc.
Scalable Vector Graphics (SVG) 1.1 Specification, W3C Candidate Recommendation
A Visual Guide to Swing Components, in The Java Tutorials, at the Sun website
Some Guidelines For Deciding Whether To Use A Rules Engine, by George Rudolph, at the Jess home page, at the Sandia National Laboratories website
Java Rule Engine API JSR-94, version 1.0, Sep. 15, 2003
The Jess FAQ, at the Jess home page, at the Sandia National Laboratories website
What is CLIPS? at the CLIPS home page, hosted at the SourceForge website
Drools is a Rules Engine implementation, released through the JBoss Community website
GrabCut has been described at the Microsoft Research Cambriged website
Macintosh Human Interface Guidelines by Apple Computer, Inc., 1992, ISBN 0-201-62216-5

What is claimed is:

1. A digital computer comprising at least:
a processing unit connected to memory;
further connected to a visual display unit hardware device, the computer programmed to produce a graphical user interface for enabling continuity of access control in a body of digital documents in common formats selected from a set comprising XML and HTML, comprising:
a first display region for editing document contents, wherein an access-control-discontinuous hyperlink is graphically represented by a visual element which comprises a commonly visually recognizable representation of a hyperlink distinctly modified by at least one step selected from a set comprising: highlighting; font modification; region outlining; and insertion of a graphic; and
a second display region which contains a graphical representation of a set exclusively comprising one or more users for whom the access-control-discontinuous hyperlink would effect access-control-discontinuity;
wherein a user is graphically represented by a visual element which comprises the identity of the user; and
wherein the access-control-discontinuous hyperlink has been determined to be access-control-discontinuous by programmatically determining its meeting the requirements of a definition of the term "access-control-discontinuous hyperlink" as a hyperlink from the displayed document to another document wherein the exactly determinable set of individual users who effectively are allowed to access the displayed document contains at least one user who is not contained in the exactly determinable set of individual users who effectively are allowed to access the linked to document.

2. The computer of claim 1, wherein the access-control-discontinuous hyperlink has been determined automatically after the user has performed a step of editing document contents.

3. The computer of claim 1, further comprising a third display region which is visually associated with a hyperlink in the first display region for document contents and shows an explanation of the access-control-discontinuity situation of the hyperlink.

4. The computer of claim 1, further comprising a third display region which is interactively associated with an operator designated hyperlink in the first display region for document contents and shows an explanation of the access-control-discontinuity situation of the hyperlink.

5. The computer of claim 1, further comprising a display region which contains a graphical representation of a set comprising one or more users, and wherein a user is graphically represented by a visual element which comprises:
the identity of the user; and one or more of the following visual elements:
indication of the quantity of hyperlinks which would effect access-control-discontinuity for the user; and
a commonly visually recognizable representation of at least one hyperlink which would effect access-control-discontinuity for the user, if possible then with context.

6. The computer of claim 1, further comprising a display region which contains a graphical representation of a set comprising one or more hyperlinks, and wherein a hyperlink is graphically represented by a visual element which comprises:
a commonly visually recognizable representation of the hyperlink, if possible then with context;
and one or more of the following visual elements:
indication of the quantity of users for whom the hyperlink would effect access-control-discontinuity;
who effectively is not allowed to access the referenced document; and
if possible to determine and to explain concisely then which one or more entities in access control settings cause the hyperlink to be access-control-discontinuous.

7. The computer of claim 1, further comprising a third display region for editing access control settings for the currently edited document, wherein a user is graphically represented by a display element comprising, at least in part, a likeness of the user, and wherein access control settings can be modified by dragging and dropping indicia for users.

8. The computer of claim 1, wherein a plurality of functions are implemented which insert, change, and remove access dependency settings for elements of the currently edited document; a context dependent subset of the functions is available for selection by the operator for use; and access dependent contents is graphically represented by visual elements which comprise commonly visually recognizable representation of contents distinctly modified by at least one step selected from a set comprising: highlighting; font modification; region outlining; and insertion of a graphic.

9. The computer of claim 8, wherein one of the functions inserts access dependency settings to effect for the currently selected elements of the document to be shown only if the accessing user is authorized to follow hyperlinks contained in the currently selected elements.

10. The computer of claim 8, for previewing what another user would see when accessing the document further comprising:
a display region for previewing what that other user would see if access dependent contents had been processed for that other user; and
a display region for indicating that other user.

11. The computer of claim 8, for previewing what different users would see when accessing the document further comprising:
a display region for previewing what a specific user would see if access dependent contents had been processed for that specific user; and
a display region for conveying users who would see the same.

12. The computer of claim 11, further in a display region conveying users who would not see the same, wherein the operator can designate a user who would not see the same to switch previewing to be for such newly designated user.

13. The computer of claim 11, further conveying the quantity of different results of processing that different users could see.

* * * * *